(12) United States Patent
Han et al.

(10) Patent No.: US 12,372,370 B2
(45) Date of Patent: Jul. 29, 2025

(54) METHOD AND APPARATUS FOR GENERATING A MAP FOR AUTONOMOUS DRIVING AND RECOGNIZING LOCATION

(71) Applicant: ELECTRONICS AND TELECOMMUNICATIONS RESEARCH INSTITUTE, Daejeon (KR)

(72) Inventors: Seung Jun Han, Daejeon (KR); Jungyu Kang, Daejeon (KR); Kyoung-Wook Min, Daejeon (KR); Taeghyun An, Daejeon (KR); Jeong Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 920 days.

(21) Appl. No.: 17/532,846

(22) Filed: Nov. 22, 2021

(65) Prior Publication Data
US 2022/0163346 A1 May 26, 2022

(30) Foreign Application Priority Data

Nov. 23, 2020 (KR) .................. 10-2020-0157663
Nov. 8, 2021 (KR) .................. 10-2021-0152332

(51) Int. Cl.
*G01C 21/00* (2006.01)
*G06T 7/10* (2017.01)

(52) U.S. Cl.
CPC ..... *G01C 21/3815* (2020.08); *G01C 21/3833* (2020.08); *G01C 21/3881* (2020.08);
(Continued)

(58) Field of Classification Search
CPC ............ G01C 21/3815; G01C 21/3833; G01C 21/3881; G01C 21/3602; G06T 7/10;
(Continued)

(56) References Cited

U.S. PATENT DOCUMENTS 7,869,646 B2 1/2011 Park
9,208,607 B2 12/2015 Chu et al.
(Continued)

FOREIGN PATENT DOCUMENTS

JP 2013162340 A 8/2013
JP 2020118586 A 8/2020
(Continued)

OTHER PUBLICATIONS

Seung-Jun Han et al., "Robust Ego-motion Estimation and Map Matching Technique for Autonomous Vehicle Localization with High Definition Digital Map" Published in: 2018 International Conference on Information and Communication Technology Convergence (ICTC), Oct. 19, 2018, pp. 630-635.
(Continued)

*Primary Examiner* — Xuemei G Chen

(57) ABSTRACT

Disclosed are a method and an apparatus for generating a map for autonomous driving and recognizing a location based on the generated map. When generating a map, a spherical range image is obtained by projecting 3D coordinate information corresponding to a 3D space onto a 2D plane, and semantic segmentation is performed on the spherical range image to generate a semantic segmented image. Then, map data including a spherical range image, a semantic segmented image, and lane attribute information are generated.

17 Claims, 21 Drawing Sheets

(52) U.S. Cl.
CPC ...... *G06T 7/10* (2017.01); *G06T 2207/10028* (2013.01); *G06T 2207/30252* (2013.01)

(58) Field of Classification Search
CPC .......... G06T 2207/10028; G06T 2207/30252; G06V 10/26; G06V 10/82; G06V 10/84; G06V 20/588; G06V 20/64; G06V 20/58
See application file for complete search history.

(56) References Cited

U.S. PATENT DOCUMENTS

| | | | |
|---|---|---|---|
| 9,233,470 B1* | 1/2016 | Bradski | B25J 9/1671 |
| 9,955,084 B1* | 4/2018 | Haynold | G06T 5/50 |
| 10,438,087 B2 | 10/2019 | Han et al. | |
| 2011/0007271 A1* | 1/2011 | Ono | G06T 5/50 351/206 |
| 2013/0245461 A1* | 9/2013 | Maier-Hein | A61B 90/361 600/476 |
| 2015/0332489 A1* | 11/2015 | Birchfield | G06T 11/206 345/440 |
| 2016/0196654 A1* | 7/2016 | Aoki | G06V 20/58 382/103 |
| 2018/0112985 A1* | 4/2018 | Madison | G05D 1/027 |
| 2019/0213787 A1* | 7/2019 | Deng | G06T 15/40 |
| 2019/0301873 A1* | 10/2019 | Prasser | G01C 21/3848 |
| 2019/0323845 A1* | 10/2019 | Agarwal | B60R 11/04 |
| 2019/0332120 A1 | 10/2019 | Choi et al. | |
| 2020/0193606 A1 | 6/2020 | Douillard | |
| 2020/0240794 A1* | 7/2020 | Prasser | G05D 1/0212 |
| 2021/0165093 A1* | 6/2021 | Komorkiewicz | G06V 10/80 |
| 2021/0227192 A1* | 7/2021 | Li | H04N 13/296 |
| 2021/0398303 A1* | 12/2021 | Lin | G01S 17/89 |
| 2022/0092734 A1* | 3/2022 | Gao | G06T 15/20 |
| 2022/0150543 A1* | 5/2022 | Fleureau | H04N 19/184 |
| 2022/0398856 A1* | 12/2022 | Quan | G06T 7/11 |

FOREIGN PATENT DOCUMENTS

| | | |
|---|---|---|
| KR | 10-2019-0134861 A | 12/2019 |
| KR | 10-2115004 B1 | 5/2020 |
| KR | 10-2176834 B1 | 11/2020 |
| WO | 2014/097445 A1 | 6/2014 |

OTHER PUBLICATIONS

Ji Zhang et al., "LOAM: Lidar Odometry and Mapping in Real-time," Published in Robotics: Science and Systems Jul. 12, 2014, pp. 1-9.

Levinson et al., "Robust Vehicle Localization in Urban Environments Using Probabilistic Maps", Published in International Conference on Robotics and Automation May 3-8, 2010, pp. 4372-4378, Anchorage, Alaska, USA.

Liang Li et al., "Road DNA Based Localization for Autonomous Vehicles," Published in Intelligent Vehicles Symposium (IV) Jun. 19-22, 2016, pp. 883-888, Gothenburg, Sweden.

Jose Luis Blanco Claraco "A tutorial on SE(3) transformation parameterizations and on-manifold optimization" Technical report #012010, May 11, 2020, pp. 1-66, Malaga, Spain.

Dellaert et al., "Factor Graphs for Robot Perception," Foundations and Trends in Robotics, Aug. 2017, pp. 1-144, vol. 6, No. 1-2.

Seung-Jun Han et al., "Effective Height-Grid Map Building using Inverse Perspective Image" Published in Intelligent Vehicles Symposium (IV) Jun. 28-Jul. 1, 2015, pp. 549-554, COEX, Seoul, Korea.

H. Hwang et al., "Adaptive Median Filters: New Algorithms and Results," Transactions on Image Processing, Apr. 1995, pp. 499-502, vol. 4, No. 4.

Seung-Jun Han et al., "Parking Space Recognition for Autonomous Valet Parking Using Height and Salient-Line Probability Maps," ETRI Journal, Dec. 2015, pp. 1220-1230, vol. 37, No. 6.

Seung-Jun Han et al., "DiLO: Direct light detection and ranging odometry based on spherical range images for autonomous driving," ETRI Journal, Mar. 7, 2021, pp. 603-616, 43(4).

Kang et al., "ETLi: Efficiently annotated traffic LiDAR dataset using incremental and suggestive annotation," ETRI Journal, Feb. 16, 2021, 630-639, 43(4).

* cited by examiner

FIG. 2A
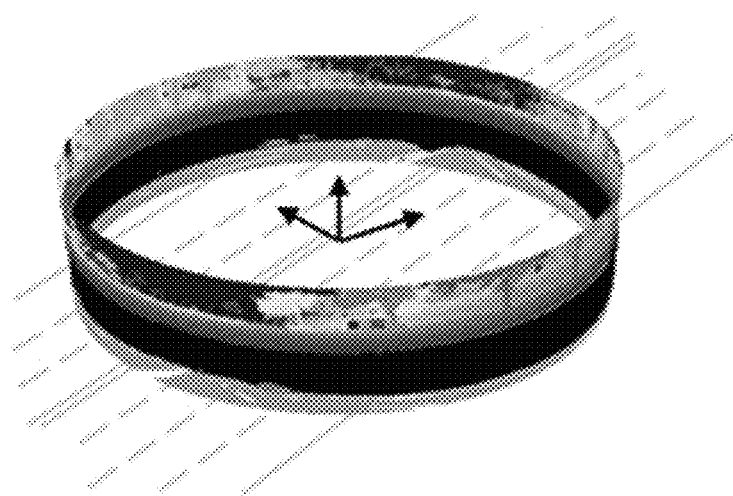
FIG. 2B
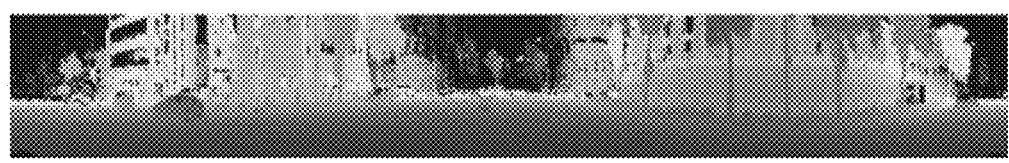
(a)
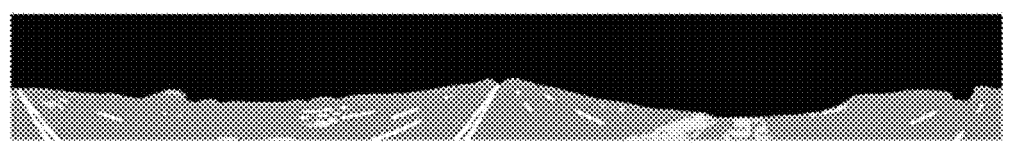
(b)
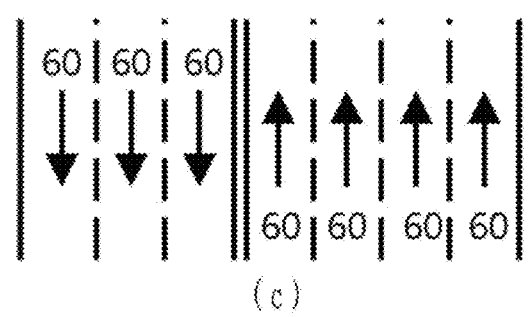
(c)

π　　　　　　　　　　0　　　　　　　　　　-π

π　　　　　　　　　　0　　　　　　　　　　-π

π　　　　　　　　　　0　　　　　　　　　　-π

Sematic data    Range data

METHOD AND APPARATUS FOR GENERATING A MAP FOR AUTONOMOUS DRIVING AND RECOGNIZING LOCATION

CROSS-REFERENCE TO RELATED APPLICATION

This application claims priority to and the benefit of Korean Patent Application Nos. 10-2020-0157663 and 10-2021-0152332 filed in the Korean Intellectual Property Office on Nov. 23, 2020 and Nov. 8, 2021, respectively, the entire contents of which are incorporated herein by reference.

BACKGROUND OF THE INVENTION

(a) Field of the Invention

The present disclosure relates to autonomous driving, and more particularly, to a method and apparatus for generating a map for autonomous driving and recognizing a location based on the generated map.

(b) Description of the Related Art

In order for autonomous vehicles to operate, it is necessary to know the precise location of the vehicle and its surrounding environment at each moment in order for the vehicle to plan a route and determine the driving method (maneuver) at every moment. In addition, for this, a high-precision map and an accurate location recognition technology based on the map are absolutely necessary.

Existing related methods include the following. First, there is a method of using a high definition (HD) map generated as a set of lines with lane-level precision. It recognizes a location through lane marking recognition and map comparison, and creates map data at the lane level manually using a point cloud map. Accordingly, there is a problem in that there is a relatively high possibility that modeling of the environment is not accurate. Second, there is a method of using a three-dimensional (3D) coordinate set itself, which is called a point cloud, as a map. In this method, an iterative closest point (ICP) method and a normal distribution transform (NDT) method are mainly used. Although these methods can obtain the highest precision, it is sensitive to initial values, and location recognition is highly likely to fail in situations where there are no rich 3D features such as highways. Moreover, a very large storage space is required to store the 3D point cloud, and there is a problem in that many operations are required to search and process each point. Third, there is a method based on the intensity of the road surface pattern. In this method, by limiting the movement of the vehicle and the shape of the road in two dimensions, the accuracy is deteriorated on a hilly road, etc., and the stability may be reduced in a section where the same floor pattern is repeated. Finally, it is a method based on the pattern around the road perpendicular to the road surface, also called RoadDNA. This method can save storage space compared to the 3D point cloud, but the precision may be lowered because there is no height information and road surface information.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a method and an apparatus for generating map data by shaping a pattern of a road surface, a pattern around a road, and 3D shape information with one image.

In addition, the present invention has been made in an effort to provide a method and an apparatus for generating a three-dimensional high-precision map using less data storage space.

Further, the present invention has been made in an effort to provide a method and an apparatus for more precisely recognizing a location using a corresponding map.

According to an embodiment of the present disclosure, a method for generating a map for autonomous driving is provided. The method includes: obtaining three-dimensional (3D) coordinate information corresponding to a 3D space; obtaining a spherical range image by projecting the 3D coordinate information onto a two-dimensional (2D) plane; generating a semantic segmented image by performing semantic segmentation on the spherical range image; and generating map data including the spherical range image, the semantic segmented image, and lane attribute information.

In an implementation, the generating of a semantic segmented image may include: performing semantic segmentation on the spherical range image; and generating the semantic segmented image including road information by removing a moving object from the image obtained by the semantic segmentation, wherein the road information may be used as segmentation information including a pattern of a road surface, a road pattern, and a pattern around a road, and the attribute information of a land road may be obtained using the segmentation information included in the semantic segmented image.

In an implementation, the map has a graph-based structure, the map data is mapped for each node constituting a graph, and edge information between nodes may include pose information, and the pose information may be a result of movement and pose estimation using a gradient of the spherical range image or a gradient of the semantic segmented image.

In an implementation, the generating of a map data may include: obtaining map data of neighboring nodes around a node corresponding to a map data generation point in a state in which map data of the node is generated; and synthesizing map data of the node and map data of the neighboring nodes and using them as map data for the node.

In an implementation, the synthesizing of map data of the node and map data of the neighboring nodes may include: synthesizing a spherical range image of the node and a spherical range image of the neighboring node; synthesizing a semantic segmented image of the node and a semantic segmented image of the neighboring node; generating the lane attribute information based on the synthesized semantic segmented image; and using data including the synthesized spherical range image, the synthesized semantic segmented image, and the lane attribute information as map data for the node.

In an implementation, in the synthesizing of a spherical range image, a synthesized spherical range image may be obtained based on a method of selecting a middle value from values accumulated for each pixel, and in the synthesizing of a semantic segmented image, a synthesized semantic segmented image may be obtained based on a method of selecting a value having a largest proportion among values accumulated for each pixel.

In an implementation, when synthesizing spherical range images or synthesizing semantic segmented images, the synthesizing may be performed in a way in which coordinate transformation on an image of the node and an image of the neighboring node is performed based on the node, and a value of a corresponding pixel of the image of the node and a value of a corresponding pixel of the image of the neighboring node may be accumulated and stored for each pixel, 2D image data is obtained by selecting one of values accumulated for each pixel, and for each pixel of the 2D image data, a final value of a pixel may be obtained based on a result of comparing values of neighboring pixels with a values of the pixel.

In an implementation, the method may further include compressing the map data, wherein in the compressing, for each pixel, the spherical range image and the semantic segmented image may be combined into one image and stored, and for a pixel composed of set bits, distance information of the spherical range image may be placed in a first bit among the set bits and segmentation information of the semantic segmented image may be placed in a second bit among the set bits.

In an implementation, the compressing may include: compressing the spherical range image and the semantic segmented image, respectively; quantizing distance information of the compressed spherical range image, and placing the quantized distance information in an upper bit among the set bits of a pixel; and quantizing segmentation information of the compressed semantic segmented image, and placing the quantized segmentation information in a lower bit among the set bits of a pixel.

In an implementation, the method may further include registering the map data, wherein the registering may include: registering generated map data as new map data when there is no existing map data in surrounding coordinates of the generated map data; and updating the existing map data based on the generated map data when there is existing map data in the surrounding coordinates of the generated map data.

In an implementation, the updating may include: repeatedly performing an operation of storing the generated map data as additional map data together with time information; and comparing the stored map data and updating the existing map data based on the additional map data when different changes in the stored map data are maintained for a preset time.

In an implementation, the method may further include optimizing the graph constituting a map, wherein the optimizing may include: connecting a global positioning system (GPS) node having GPS data to a corresponding node when GPS data is obtained for each node; connecting corresponding nodes when loop closure is detected in the graph; and combining lane attribute information included in each node using pose information.

Another embodiment of the present invention provides a method for recognizing a location based on a map for autonomous driving. The method includes: obtaining a spherical range image based on data input from a sensor at a current node, and generating a semantic segmented image from the spherical range image; obtaining an initial location based on global positioning system (GPS) data or a previous driving route; searching map data from the map based on the initial location; and obtaining a current location based on the searched map data, wherein the map data of the map includes the spherical range image, the semantic segmented image, and lane attribute information.

In an implementation, the map may have a graph-based structure, the map data may be mapped for each node constituting a graph, and edge information between nodes may include pose information, and the pose information may be a result of movement and pose estimation using a gradient of the spherical range image or a gradient of the semantic segmented image.

In an implementation, the obtaining of a current location may include: estimating pose information of the current node with respect to the searched map data; obtaining the current location using the map data when the estimated pose information and pose information according to movement of the current node satisfy a setting condition; and additionally obtaining the current location using the GPS data when there is GPS data in the current node.

Yet another embodiment of the present invention provides an apparatus for recognizing a location. The apparatus includes: an interface device; and a processor connected to the interface device and configured to perform location recognition, wherein the processor is configured to perform operations by: projecting three-dimensional (3D) coordinate information corresponding to a 3D space inputted through the interface device onto a two-dimensional (2D) plane to obtain a spherical range image; generating a semantic segmented image by performing semantic segmentation on the spherical range image; obtaining an initial location based on global positioning system (GPS) data or a previous driving route; searching map data from the map based on the initial location; and obtaining a current location based on the searched map data, wherein the map data of the map includes the spherical range image, the semantic segmented image, and lane attribute information.

In an implementation, the map may have a graph-based structure, the map data may be mapped for each node constituting a graph, and edge information between nodes may include pose information, and the pose information may be a result of movement and pose estimation using a gradient of the spherical range image or a gradient of the semantic segmented image.

In an implementation, the processor may be configured to further perform an operation by generating map data includes a spherical range image, a semantic segmented image, and lane attribute information, and when performing the operation of generating map data, the processor may be specifically configured to perform operations by: obtaining map data of neighboring nodes around a node corresponding to a map data generation point in a state in which map data of the node is generated; synthesizing a spherical range image of the node and a spherical range image of the neighboring node; synthesizing a semantic segmented image of the node and a semantic segmented image of the neighboring node; generating the lane attribute information based on the synthesized semantic segmented image; and using data including the synthesized spherical range image, the synthesized semantic segmented image, and the lane attribute information as map data for the node.

In an implementation, when performing the operation of generating a semantic segmented image, the processor may be specifically configured to perform operations by: performing semantic segmentation on the spherical range image; and generating the semantic segmented image including road information by removing a moving object from the image obtained by the semantic segmentation, wherein the road information may be used as segmentation information including a pattern of a road surface, a road pattern, and a pattern around a road, and the attribute information of a land road may be obtained using the segmentation information included in the semantic segmented image.

In an implementation, the map data may be compressed and stored, wherein when compressing, for each pixel, the spherical range image and the semantic segmented image may be combined into one image and stored, and for a pixel composed of set bits, distance information of the spherical range image may be placed in a first bit among the set bits and segmentation information of the semantic segmented image may be placed in a second bit among the set bits.

BRIEF DESCRIPTION OF THE DRAWINGS

FIG. 2A and FIG. 2B are exemplary diagrams illustrating map data of a node according to an embodiment of the present disclosure.

DETAILED DESCRIPTION OF THE EMBODIMENTS

Figure 1:
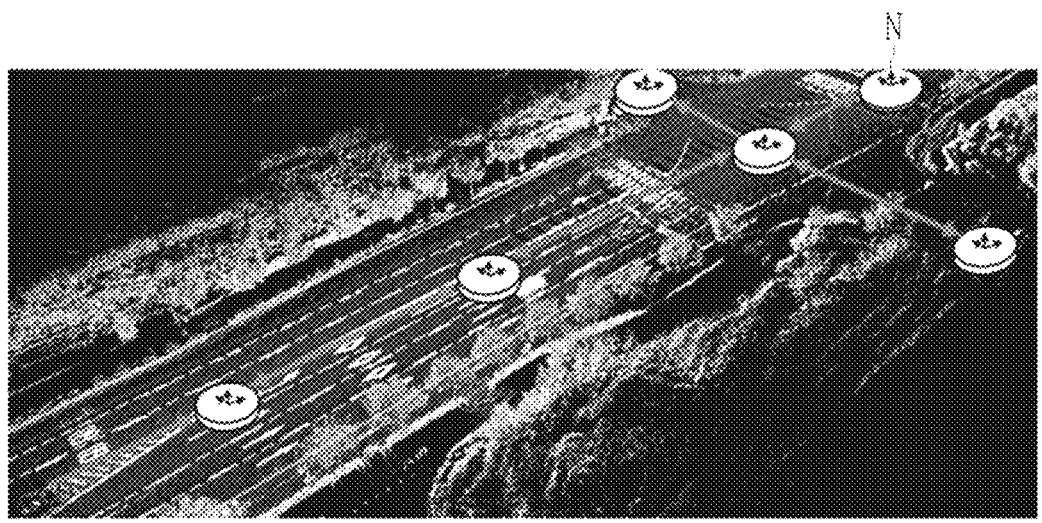
FIG. 1 is an exemplary diagram illustrating a three-dimensional map according to an embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

The expressions described in the singular may be interpreted as singular or plural unless an explicit expression such as "one", "single", and the like is used. In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component Hereinafter, a method and an apparatus for generating a map for autonomous driving and recognizing a location based on the generated map.

FIG. 1 is an exemplary diagram illustrating a three-dimensional map according to an embodiment of the present disclosure.

In an embodiment of the present disclosure, map data for a three-dimensional (3D) map obtained for autonomous driving has a node-based graph structure as illustrated in FIG. 1. Here, the node-based graph structure is expressed, for example, on a point cloud map. Nodes N of the graph are positioned at preset intervals, and in particular, as shown in FIG. 1, they may be generated at preset intervals around an intersection. The edge information between each node is pose information between the nodes.

The three-dimensional map illustrated in FIG. 1 is an existing point cloud map, and consists of many three-dimensional points in order to express a three-dimensional shape. In some cases, characteristic information such as intensity of a point may be included in information about each point. These point cloud-based 3D maps enable precise location recognition by depicting the actual environment in detail, but the data size is very large, thereby storage, management, and processing are difficult.

In an embodiment of the present disclosure, the map data of each node includes an image in which distance information and semantic segmentation information are projected on a spherical plane, and attribute information of a lane.

FIG. 2A and FIG. 2B are exemplary diagrams illustrating map data of a node according to an embodiment of the present disclosure.

When the image obtained around one node and the lane attribute information are shaped, it is as illustrated in FIG. 2A. The map data of such a node includes a spherical range image, a semantic segmented image, and lane attribute information.

The spherical range image is an image obtained by projecting three-dimensional coordinate information onto a spherical plane instead of three-dimensional points around a node, as illustrated in (a) of FIG. 2B. This spherical range image includes distance information. The distance information may be represented, for example, in different colors.

The semantic segmented image is an image obtained by semantically segmenting a spherical range image. The object to be segmented in the image is a moving object and road information, the moving object includes a vehicle and a person, and the road information includes a road, a lane marking, a road surface, and the like. If a spherical range image is semantically segmented and then a moving object is removed from the image, as illustrated in (b) of FIG. 2B, an image including a pattern of a road surface, a road pattern, and a pattern around a road, that is, a semantic segmented image, is obtained. Here, including the pattern of the road surface, the road pattern, and the pattern around the road, it may be collectively referred to as semantic segmentation information.

In the semantic segmented image according to an embodiment of the present disclosure, texture information and semantic information may be expressed together with less data, unlike intensity information of a point.

The attribute information of the lane is information indicating the attribute of the lane generated from the semantic segmentation information. The attribute information of the lane is obtained using road information obtained from the semantic segmentation information and various additional information related to the lane (e.g., lane marking limit speed, road mark, etc.), and as illustrated in (c) of FIG. 2B, may include the speed limit for each lane marking.

The attribute information of the lane may include information obtained from color information of the lane marking. For example, in an image obtained from a camera, color information of each pixel corresponding to a lane marking dividing pixel is calculated to obtain color information of a lane marking, and additional lane attributes necessary for map generation can be obtained from the color information of the lane marking.

In an embodiment of the present disclosure, the map data of the node includes such a spherical range image, a semantic segmented image, and lane attribute information. In particular, the size of stored data is reduced by expressing 3D information as a two-dimensional (2D) image, so not only is a very fast operation possible, but also restoration into a 3D shape is easy. Map data is mutually independent for each node, making it easy to search, modify, and manage the data.

In an embodiment of the present disclosure, the above map data is generated, a location is recognized based on the map data, and data management including storage and optimization of the map data is additionally performed.

Figure 3:
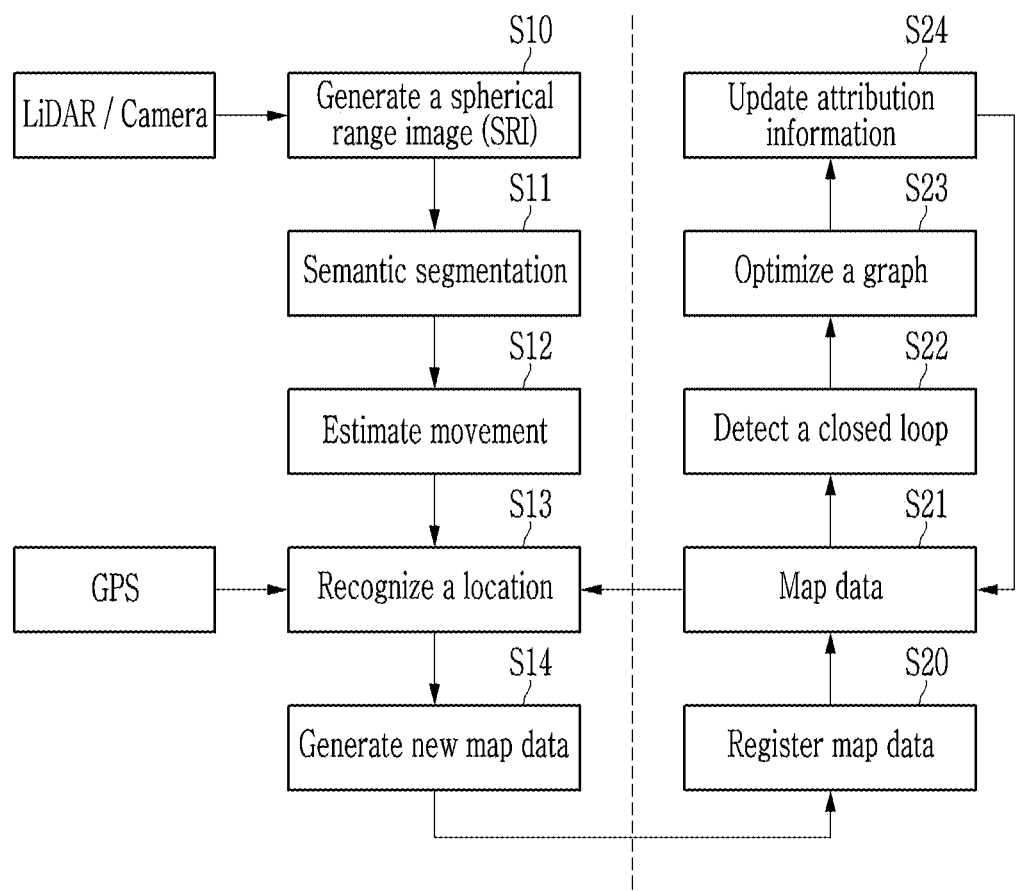
FIG. 3 is a conceptual diagram illustrating an overall process of generating a map for autonomous driving and recognizing a location based on the map according to an embodiment of the present disclosure.

FIG. 3 is a conceptual diagram illustrating an overall process of generating a map for autonomous driving and recognizing a location based on the map according to an embodiment of the present disclosure.

The process according to the embodiment of the present disclosure may be largely divided into a location recognition part and a map management part, as shown in FIG. 3, and may be performed. The location recognition part uses sensor data to recognize location or create new map data. Map data processing and optimization are performed in the map management part.

Specifically, in the location recognition part, for example, location recognition is performed or new map data is generated in real time while a vehicle is driving. First, a spherical range image SRI is generated by projecting 3D information collected from a sensor such as LiDAR or a camera onto a 2D plane (S10), and semantic segmentation is performed on the spherical range image to obtain semantic segmented image is obtained (S11). Then, the movement of the vehicle is estimated using the spherical range image and the semantic segmented image (S12). Thereafter, location recognition for obtaining the location of the vehicle is performed based on the movement path of the vehicle, map data that has already been generated, and global positioning system (GPS) information (S13).

When recognizing a location, if there is no map data or if there is a large error at the current location, new map data is generated (S14). New map data may also be generated each time the vehicle passes a preset area, for example, an intersection, or at preset intervals while the vehicle is driving. As described above, the map data includes a spherical range image, a semantic segmented image, and lane attribute information.

In the map management part, map data that is newly generated in the location recognition part is registered (S20). When registering new map data, a new registration process is performed by comparing the new map data with the existing map data or an update process of the existing map data is performed (S21).

In order to improve the precision of the stored map data, it is possible to detect a loop closure in the map data and perform pose graph optimization (S22 to S23) to determine the precise location of each node.

Then, the attribute information of the lane included in each node may be updated using the optimized node location information (S24). In other words, the high-resolution map data at the level of the lane is updated by combining the locations of the optimized roadway.

The process of this map management part can be performed in non-real time. In addition, in order to provide map data to several vehicles and collect map data, The process of this map management part may be designed to be performed on a separate server.

Here, a description will be given of recognizing the location of the vehicle as an example, but it is not necessarily limited to recognizing the location of the vehicle.

Next, a specific method of each process as described above will be described.

First, a method of obtaining a spherical range image will be described.

Figure 4:
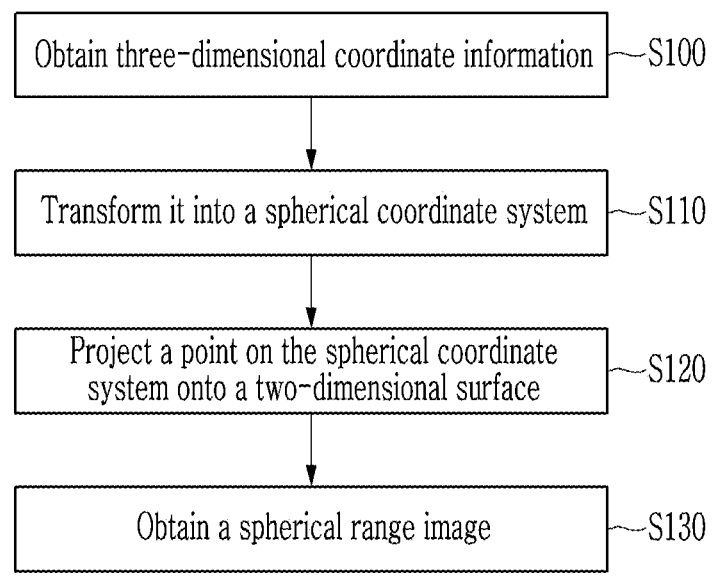
FIG. 4 is a flowchart of a method of obtaining a spherical range image according to an embodiment of the present disclosure.

FIG. 4 is a flowchart of a method of obtaining a spherical range image according to an embodiment of the present disclosure.

In an embodiment of the present disclosure, a spherical range image is obtained by projecting 3D coordinate information corresponding to 3D spatial information onto a 2D plane. In particular, in an embodiment of the present disclosure, 3D coordinate information is projected onto a 2D surface using a spherical coordinate system so that data projection in all directions around the vehicle is possible. The 3D coordinate information may be collected from a sensor capable of obtaining 3D spatial information, such as a LiDAR or a stereo camera, and is also called a 3D point cloud.

To this end, 3D coordinate information is obtained (S100), and the 3D coordinate information is transformed into a spherical coordinate system (S110).

Figure 5A:
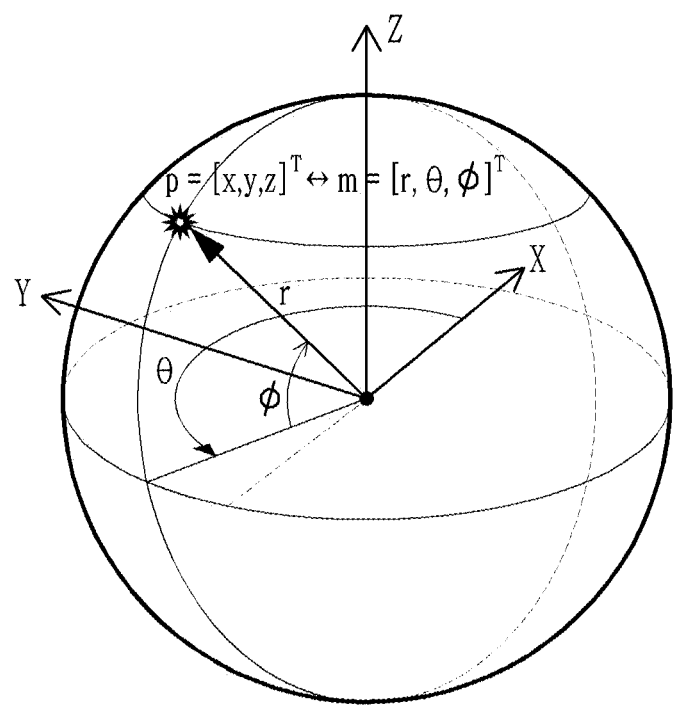
FIG. 5A and FIG. 5B are exemplary diagrams illustrating a spherical coordinate system according to an embodiment of the present disclosure.
Figure 5B:
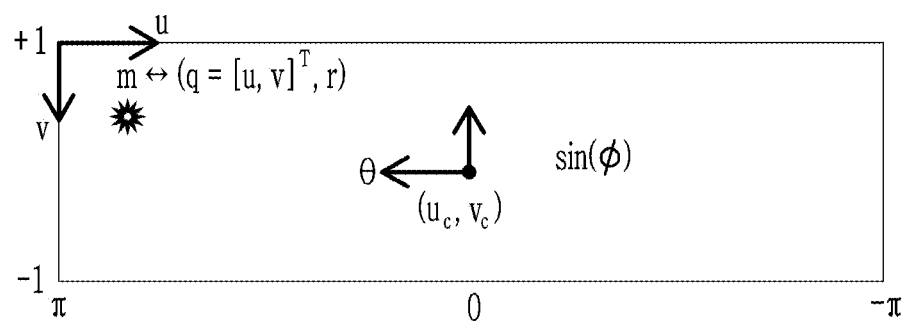

FIG. 5A and FIG. 5B are exemplary diagrams illustrating a spherical coordinate system according to an embodiment of the present disclosure.

Based on the spherical coordinate system of FIG. 5A and FIG. 5B, a point $p=[x, y, z]^T$ on the cartesian coordinate can be converted into a point $m=[r, \theta, \phi]^T$ on the spherical coordinate system (refer to FIG. 5A), and expressed as a formula as follows.

$$m = \begin{bmatrix} r \\ \theta \\ \phi \end{bmatrix} = \begin{bmatrix} \sqrt{x^2+y^2+z^2} \\ \mathrm{atan}\left(\frac{y}{x}\right) \\ \mathrm{asin}\left(\frac{z}{\sqrt{x^2+y^2+z^2}}\right) \end{bmatrix} \quad \text{Equation 1}$$

Here, r represents a range or radial distance, $\theta$ represents an azimuth, and $\phi$ represents an altitude.

A point on the spherical coordinate system is projected onto a 2D surface (S120). That is, a point m on the spherical coordinate system is converted into one coordinate (also called image coordinate) of the two-dimensional coordinate system using the following Equation.

$$q = \begin{bmatrix} u \\ v \end{bmatrix} = \begin{bmatrix} -s_\theta \theta + c_u \\ -s_\phi \sin(\phi) - c_v \end{bmatrix} = \begin{bmatrix} -s_\theta \mathrm{atan}\left(\frac{y}{x}\right) + c_u \\ -s_\phi \frac{z}{\sqrt{x^2+y^2+z^2}} + c_v \end{bmatrix} \quad \text{Equation 2}$$

Through Equation 2 above, a point m on the spherical coordinate system is converted into image coordinates $q=[u, v]^T$ having an r value (refer to FIG. 5B).

Here, $s_\theta$ and $s_\phi$ represent transformation proportional constants between an angle and a pixel, and may be defined as $$s_\theta = s_\phi = \frac{\text{size\_of\_column}}{2\pi}$$

for convenience of operation. In the embodiment of the present disclosure, it is noted that $\sin(\phi)$, not $\phi$, is used as a variable to obtain the coordinate v of the vertical axis. Accordingly, the above Equation 2 for the coordinate conversion can be simplified, and the resolution of a value having a large $\phi$ is lowered. This reduces the data of relatively low proportions, such as a floor or a tall building, and reduces the size of the image data.

As described above, each point of the 3D point cloud (three-dimensional coordinate information) is projected onto a 2D surface through Equations 1 and 2 to generate a spherical range image (S130).

Meanwhile, the restoration from the spherical range image to the 3D coordinate information can be simply performed from the following inverse transformation equation.

$$p = \begin{bmatrix} x \\ y \\ z \end{bmatrix} = r \begin{bmatrix} \cos(\theta)\cos(\phi) \\ \sin(\theta)\cos(\phi) \\ \sin(\phi) \end{bmatrix} = r \begin{bmatrix} \cos(\sigma_1)\sqrt{1-\sigma_2^2} \\ \sin(\sigma_1)\sqrt{1-\sigma_2^2} \\ \sigma_2 \end{bmatrix} \quad \text{Equation 3}$$

Here, the variables $\sigma_1$ and $\sigma_2$ are defined as $$\sigma_1 = \theta = \frac{u+c_v}{s_\phi}$$

and $$\sigma_2 = \sin(\phi) = \frac{c_v+v}{s_\phi}$$

from Equation 2, and in this case, a table calculated in advance for each pixel may be used.

Figure 6A:
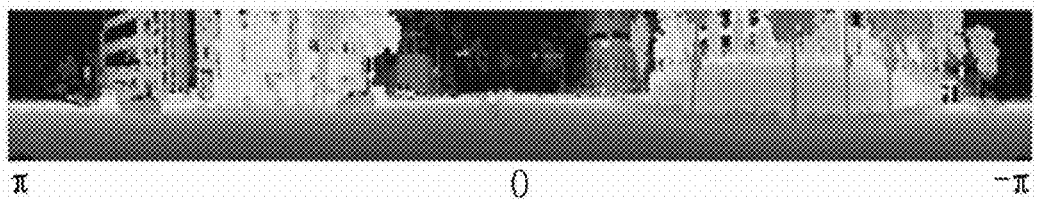
FIG. 6A to FIG. 6C are exemplary diagrams illustrating a spherical range image according to an embodiment of the present disclosure.
Figure 6B:
Figure 6C:
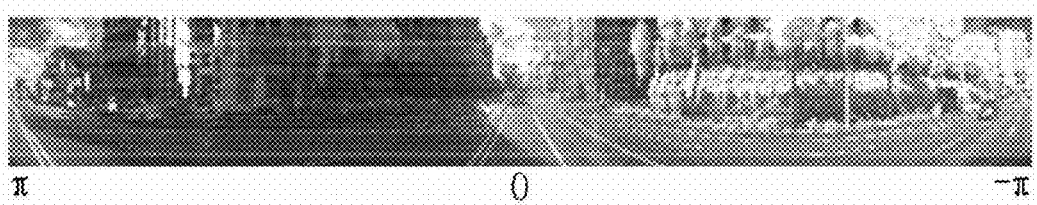

FIG. 6A to FIG. 6C are exemplary diagrams illustrating a spherical range image according to an embodiment of the present disclosure.

An image in which a spherical range image is expressed according to distance is shown in FIG. 6A, where different colors may be displayed according to distance. Textures corresponding to spherical range images are shown in FIG. 6B and FIG. 6C. Specifically, the intensity according to the signal reflected from the LiDAR corresponding to the spherical range image is shown in FIG. 6B. A camera image (e.g., brightness) corresponding to a spherical range image is shown in FIG. 6C

In this way, texture information such as intensity and brightness may be obtained together with distance information from the spherical range image. The texture information has a weakness in that the intensity changes according to the influence of weather, illuminance, etc. and requires more storage space.

In an embodiment of the present disclosure, semantic segmentation information is used instead of texture information obtained from a spherical range image.

Next, a method for obtaining a semantic segmented image will be described.

Figure 7:
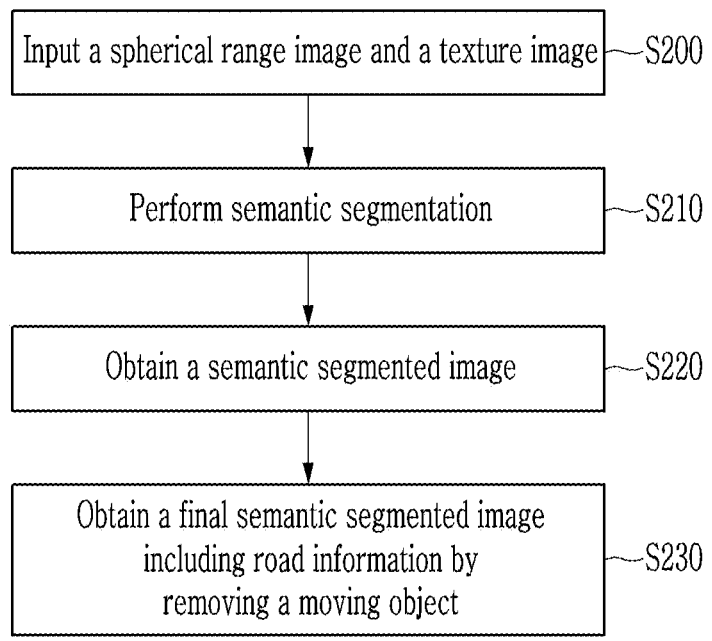
FIG. 7 is a flowchart of a method of obtaining a semantic segmented image according to an embodiment of the present disclosure.

FIG. 7 is a flowchart of a method of obtaining a semantic segmented image according to an embodiment of the present disclosure.

In an embodiment of the present disclosure, semantic segmentation is dividing each pixel in an image into units of information that it means. The brightness information of the image is divided into several representative semantic units. Accordingly, it is robust to environmental changes and can be stored with very little data.

As shown in the attached FIG. 7, a spherical range image and a texture image (e.g., the intensity image of FIG. 6B) corresponding thereto are used as input (S200). Semantic segmentation is performed using these input images (S210). When performing semantic segmentation, a deep neural network may be used.

By classifying each pixel in the image into units of information that it means, for example, moving object information and road information, a semantic segmented image is obtained (S220). Here, the moving object information indicates a moving object such as a vehicle or a pedestrian, and the road information indicates a road, a lane marking, a road surface indication, and the like. Moving object information is used for obstacle processing during autonomous driving, and other road information is used as texture information.

Then, a final semantic segmented image is obtained by removing the moving object from the image obtained in step S220 (S230).

FIG. 8A to FIG. 8D are exemplary diagrams illustrating a result of performing semantic segmentation according to an embodiment of the present disclosure.

Figure 8A:
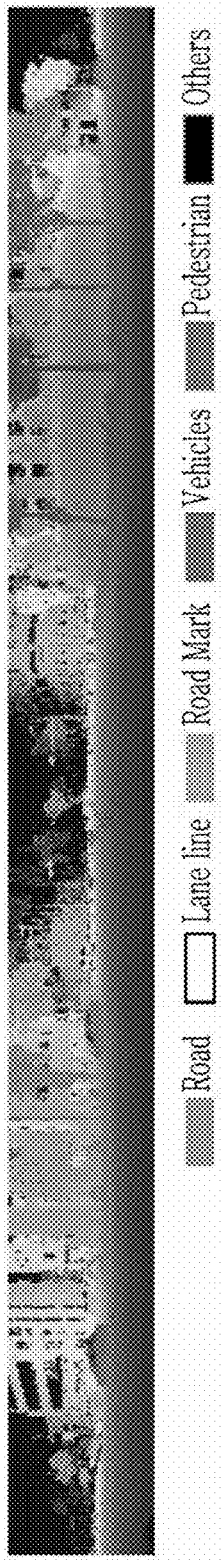
FIG. 8A to FIG. 8D are exemplary diagrams illustrating a result of performing semantic segmentation according to an embodiment of the present disclosure.
Figure 8B:
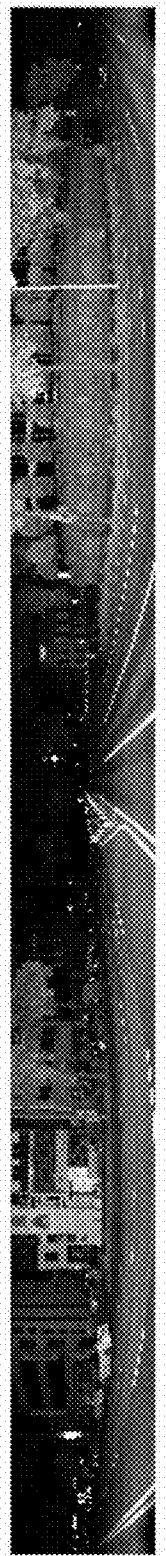
Figure 8C:
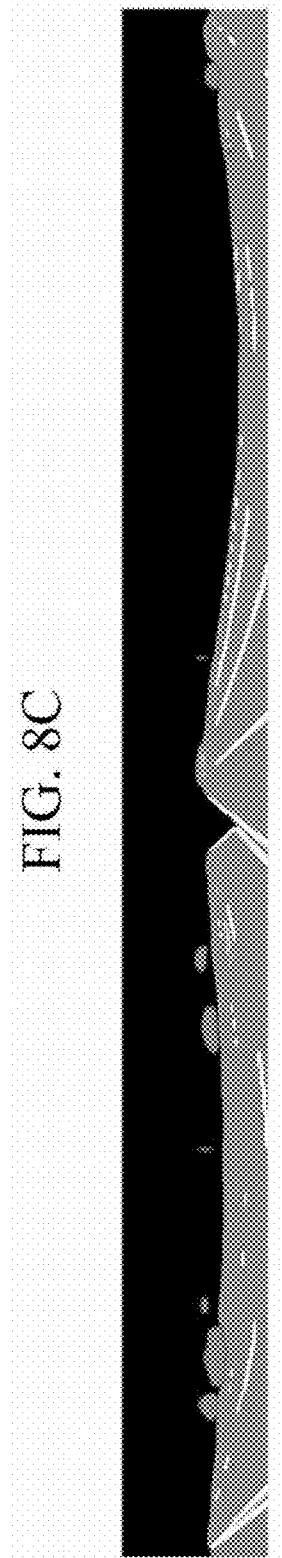
Figure 8D:
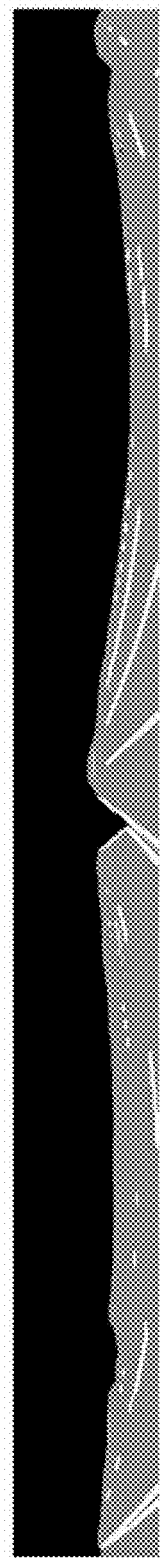

A spherical range image, which may be a color image displayed in different colors according to distance information, is shown in FIG. 8A. An intensity image, that is, a texture image according to a signal reflected from the lidar sensor corresponding to the spherical range image is shown in FIG. 8B. An image as a result of performing semantic segmentation using a deep neural network with a spherical range image and a texture image as inputs is shown in FIG. 8C. An image in which a moving object (vehicle, pedestrian, etc.) is removed from the result image in FIG. 8A is shown in FIG. 8D. Here, only road information remains, and this may be used as information on a pattern of a road surface, a road pattern, and a pattern around a road.

Location recognition of vehicles, etc. is performed based on such map data.

First, a method of performing movement and pose estimation for location recognition will be described.

Figure 9:
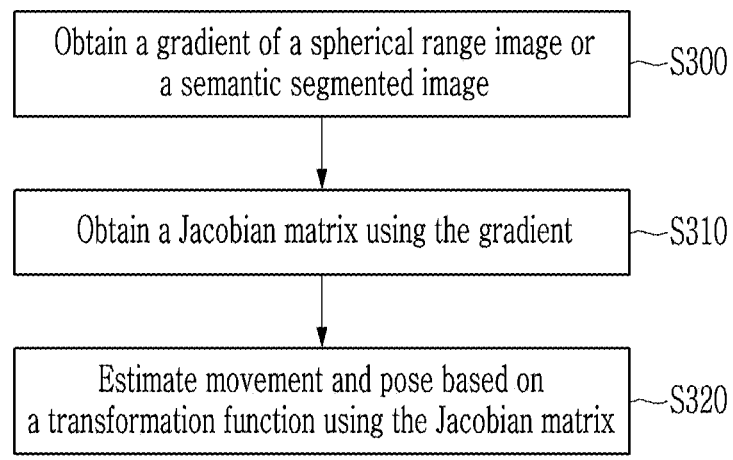
FIG. 9 is a flowchart of a movement and pose estimation method according to an embodiment of the present disclosure.

FIG. 9 is a flowchart of a movement and pose estimation method according to an embodiment of the present disclosure.

In an embodiment of the present disclosure, location recognition is performed using a spherical range image/semantic segmented image.

An important factor for generating a map or recognizing a location is motion estimation for estimating a moving path of a vehicle and estimating a vehicle's pose from landmarks on the map. Estimating the amount of geometric change that occurs between sensor data collected at successive times is called motion estimation. Estimating the amount of change collected from different sensors or at different time points is called pose estimation. For motion estimation and pose estimation, it is necessary to solve the same problem of estimating parameters for the converted distance and angle between the sensors.

An embodiment of the present disclosure provides a method of estimating ego-motion estimation and pose on map data in a single method using a spherical range image.

Specifically, ego-motion estimation and pose estimation are performed using a spherical range image (or a semantic segmented image). For ego-motion estimation, a method of estimating a motion obtained from an image change between a previous frame and a current frame, and obtaining an optimal parameter for this purpose, may be used.

For ego-motion estimation and pose estimation on map data, parameters $\xi=[v, \omega]^T$ to be estimated in an embodiment of the present disclosure are movement $v$ and rotation $\omega$ on a 3D space and may be a vector having a total of 6 parameters. For convenience of description, a parameter to be estimated may be referred to as a parameter for displacement.

For example, if the data $s$ of the first image (e.g., a previous frame) corresponds to $s'$ of the second image (e.g., a current frame), this is represented by $s'=\mathcal{F}(\xi; s)$ with the transform function $\mathcal{F}$, and the residual between the correspondences can be defined as follows.

$$r = \mathcal{F}(\xi; s) - s' \qquad \text{Equation 4}$$

Finding the parameter value that minimizes the sum of the squares of the residual is called least squares minimization, and it is expressed as follows.

$$E = \underset{\xi}{\arg\min} \sum_i \|\mathcal{F}(\xi; s) - s'\|^2 \qquad \text{Equation 5}$$

Various methods can be used to solve this Equation 5. In the exemplary embodiment of the present disclosure, an M-estimation method that has fast convergence and is robust against noise is used, but is not limited thereto. In the M-estimation method, the residual is processed using the loss function p as follows in order to effectively process noises.

$$E = \underset{\xi}{\arg\min} \sum_i \rho(\mathcal{F}(\xi; s) - s') \qquad \text{Equation 6}$$

Estimation of the parameter is made by repeating updating of the amount of change $\delta\xi$ of the parameter until the error converges using the following Equation.

$$\begin{cases} \delta\xi = -(J^T W J)^{-1} J^T W r \\ \xi \leftarrow \xi \boxplus \delta\xi \end{cases} \qquad \text{Equation 7}$$

Here, J is the Jacobian matrix of the transform function $\mathcal{F}(\xi; s)$, and W is the weight matrix defined by $$WW = \frac{\partial \rho}{\partial r} r$$

which is the product of the derivative and residual of the loss function. The operator $\boxplus$ represents a normal addition operation on a Euclidean space, and is computed using an exponential map. The loss functions include Huber, Tukey, and t-distribution, and they function to attenuate the value in the region where the estimation error increases.

As described above, according to an embodiment of the present disclosure, a necessary parameter estimation is solved by obtaining a transform function and a Jacobian of a spherical range image.

The value of each pixel of the spherical range image is called s, and the Jacobian matrix J of the transform function is decomposed as follows due to the chain rule.

$$J = \frac{\partial s}{\partial \xi} = \frac{\partial s}{\partial u \partial v} \frac{\partial u \partial v}{\partial x \partial y \partial z} \frac{\partial x \partial y \partial z}{\partial \xi} \qquad \text{Equation 8}$$

In Equation 8, the first term $$\frac{\partial s}{\partial u, v}$$

represents me gradient or the spherical range image. The second term is the partial derivative of Equation 2, and is obtained as follows.

$$\frac{\partial u \partial v}{\partial x \partial y \partial z} = \begin{bmatrix} \frac{s_\theta y}{x^2+y^2} & -\frac{s_\theta y}{x^2+y^2} & 0 \\ \frac{s_\phi xz}{(x^2+y^2+z^2)^{3/2}} & \frac{s_\phi yz}{(x^2+y^2+z^2)^{3/2}} & -\frac{s_\phi(x^2+y^2)}{(x^2+y^2+z^2)^{3/2}} \end{bmatrix}$$

$$= \begin{bmatrix} \frac{s_\theta y}{d} & -\frac{s_\theta x}{d} & 0 \\ \frac{s_\phi xz}{r^3} & \frac{s_\phi yz}{r^3} & -\frac{s_\phi d}{r^3} \end{bmatrix}$$

Equation 9

Here, $r = \sqrt{x^2+y^2+z^2}$, and $d = x^2+y^2$.

In Equation 8, the last term is defined as follows when the parameter $\xi$ is defined as a Lie algebra of a tangent space.

$$\frac{\partial x \partial y \partial z}{\partial \xi} = [1 \ -[p]_\times] = \begin{bmatrix} 1 & 0 & 0 & 0 & z & -y \\ 0 & 1 & 0 & -z & 0 & x \\ 0 & 0 & 1 & y & -x & 0 \end{bmatrix}$$

Equation 10

Through the above process, it is possible to obtain the final Jacobian matrix in a relatively simple form as follows.

$$J = \frac{\partial s}{\partial \xi} = \frac{\partial s}{\partial u \partial v} \begin{bmatrix} \frac{s_\theta y}{d} & -\frac{s_\theta x}{d} & 0 & \frac{s_\theta xz}{d} & \frac{s_\theta yz}{d} & -s_\theta \\ \frac{s_\phi xz}{r^3} & \frac{s_\phi yz}{r^3} & -\frac{s_\phi d}{r^3} & -\frac{s_\phi y}{r} & \frac{s_\phi x}{r} & 0 \end{bmatrix}$$

Equation 11

When the Jacobian matrix is obtained in this way, the parameter for displacement can be calculated using Equations 4, 7, and 11.

Meanwhile, in this embodiment of the present disclosure, not only distance information but also a semantic segmented image may be used as the value s of each pixel. The first term $$\frac{\partial s}{\partial u, v}$$

in Equation 11 may be replaced with the gradient of the semantic segmented image instead of the gradient of the spherical range image.

When using a semantic segmented image, separate processing may be performed. The semantic segmented image has a representative value for each pixel, and it is necessary to substitute an appropriate value for image processing. It is helpful to improve the precision by analyzing the precision of the division result and replacing it with a value proportional to it. In order to improve operation speed and robustness, it is preferable to select only important pixels rather than calculating the values of all pixels. First, pixels for a moving object are removed from the semantic segmentation result. Next, a value in which the gradient of the image is greater than or equal to a specific threshold is selected, but pixels having a high spatial frequency, such as the leaves of a street tree, are excluded. In the embodiment of the present disclosure, there is no need for a technique such as an octree for processing three-dimensional coordinates, and data processing is possible at very high speed, so it is a very efficient way to expect a parameter estimation error of 0.6% or less in an operation time of 5 ms or less in the latest central processing unit (CPU).

As described above, according to an embodiment of the present disclosure, referring to FIG. 9, a gradient of a spherical range image or a semantic segmented image is obtained (S300). Then, a Jacobian matrix is obtained using this gradient (S310), and a parameter that minimizes the residual between the first image (e.g., previous spherical range image) and the second image (e.g., current spherical range image) based on the equations (Equations 4, 7, and 11) described above using the Jacobian matrix, to estimate movement and pose according to movement and rotation on a three-dimensional space (S320), is used. The movement and pose estimation results obtained through this estimation process are called pose information for convenience of explanation. Thereafter, location recognition is performed using the pose information.

Figure 10:
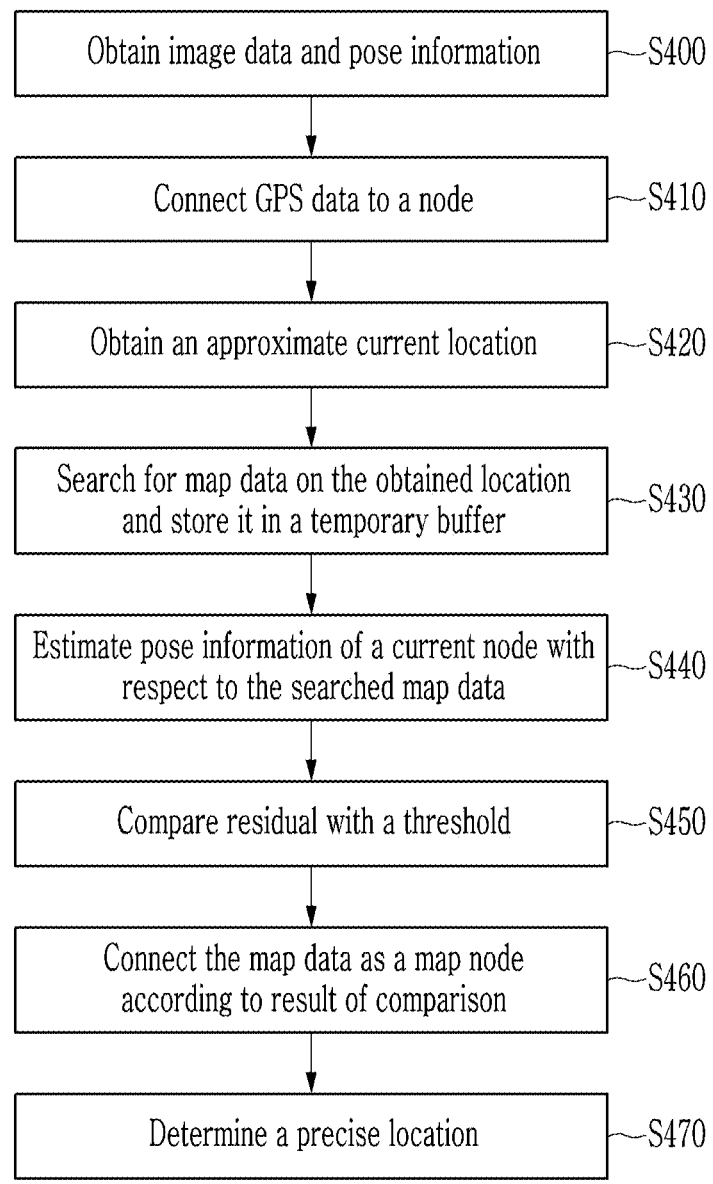
FIG. 10 is a flowchart of a location recognition method according to an embodiment of the present disclosure.

FIG. 10 is a flowchart of a location recognition method according to an embodiment of the present disclosure.

When recognizing a location, map data of each node that has already been generated, pose information, which is a result of movement and pose estimation based on image data (spherical range image, semantic segmented image) obtained from sensor input according to the above estimation method, and global positioning system (GPS) information are used.

Figure 11:
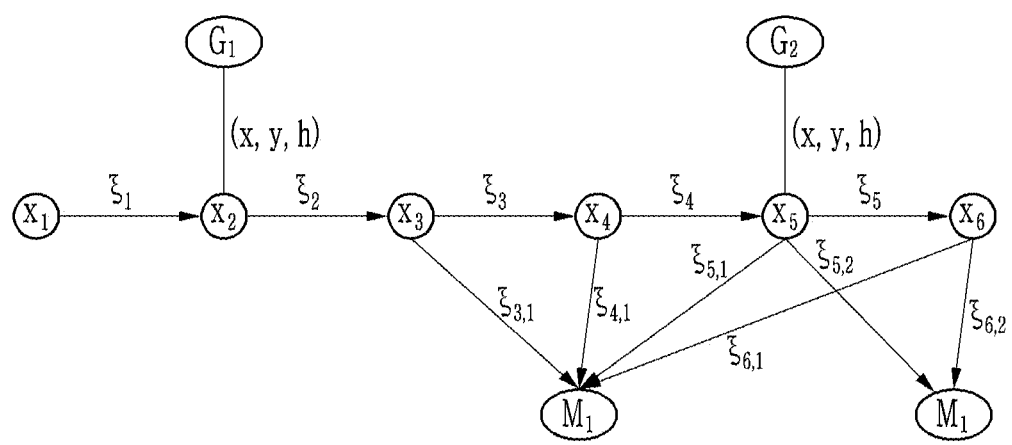
FIG. 11 is an exemplary diagram illustrating a pose graph according to an embodiment of the present disclosure.

In an embodiment of the present disclosure, a pose graph expressing pose information as a graph based on a map graph is shown in FIG. 11. FIG. 11 is an exemplary diagram illustrating a pose graph according to an embodiment of the present disclosure.

Referring to FIG. 11, in the pose graph, edge information between nodes $(x_1, x_2, \ldots x_6)$ corresponding to the location of the vehicle at each point in time as the vehicle is driven is the pose information $(\xi_1, \xi_2, \ldots \xi_5)$.

GPS data can be input to any node. When there is GPS data, the GPS nodes $G_1$ and $G_2$ having the GPS data (coordinates and altitude) obtained from the GPS as an edge may be connected. Here, $M_1$ and $M_2$ represent nodes of already generated map data.

Referring to FIG. 10, as the vehicle drives, image data for the current point, that is, the current node, that is, a spherical range image and a semantic segmented image, are obtained from data obtained from a sensor (LiDAR or camera, etc.) (S400). In this case, a spherical range image and a semantic segmented image are obtained based on the method described above (the method according to FIGS. 4 to 6 and the method according to FIGS. 7 and 8). Then, pose information is obtained using image data (the spherical range image and the semantic segmented image).

It checks whether GPS data exists in the sensor node, that is, the current node, and if there is GPS data, it connects the GPS node (these nodes are also called unary factors) with coordinates and altitudes obtained from the GPS data as edges to the current node (S410). For example, as shown in FIG. 11, if the current node is $x_1$, if GPS data exists, the GPS node $G_1$ having the GPS data as an edge is connected to the current node $x_1$.

Then, an approximate current location is obtained based on GPS data or a previous driving route (S420). Map data that has already been generated based on the obtained location is searched for, and map data around the obtained location is found and stored in a temporary buffer (S430).

Thereafter, the pose information of the current node with respect to the searched map data is estimated (S440). Here, movement and pose estimation may be performed based on the estimation method described above.

Then, the residual of the pose information estimated for the map data and the pose information according to the movement of the current node is compared with a threshold value (S450). For example, the average of the sum of the residuals is compared with a preset threshold, and when it is smaller than the preset threshold, the corresponding map data is connected as a map node in the graph (S460). For example, as shown in FIG. 11, when the current node is $x_3$, the map node $M_1$ that is map data corresponding to a case smaller than the preset threshold is connected to the current node $x_3$.

Thereafter, a precise location is obtained using GPS data and map data (S470). That is, the precise location is determined based on the map graph (e.g., the pose graph of FIG. 11) in which the node connection is made as described above. In this case, after optimization of the map graph is made, precise location determination can be made.

Meanwhile, in step S430, when map data does not exist, that is, when traveling on a new route, as shown in FIG. 11, only GPS nodes are added and optimized, such as nodes $x_1$ and $x_2$.

Therefore, location recognition is performed by selectively using image data, GPS data, and map data on the optimized graph.

For sensor nodes, although the error between nodes is very small, there is a problem that the error is accumulated and gradually increases. However, when constructing the graph as described above, it effectively suppresses the increase in sensor node error, making it possible to maintain global coordinates with high precision when generating new maps.

Next, a method for generating new map data will be described.

Figure 12:
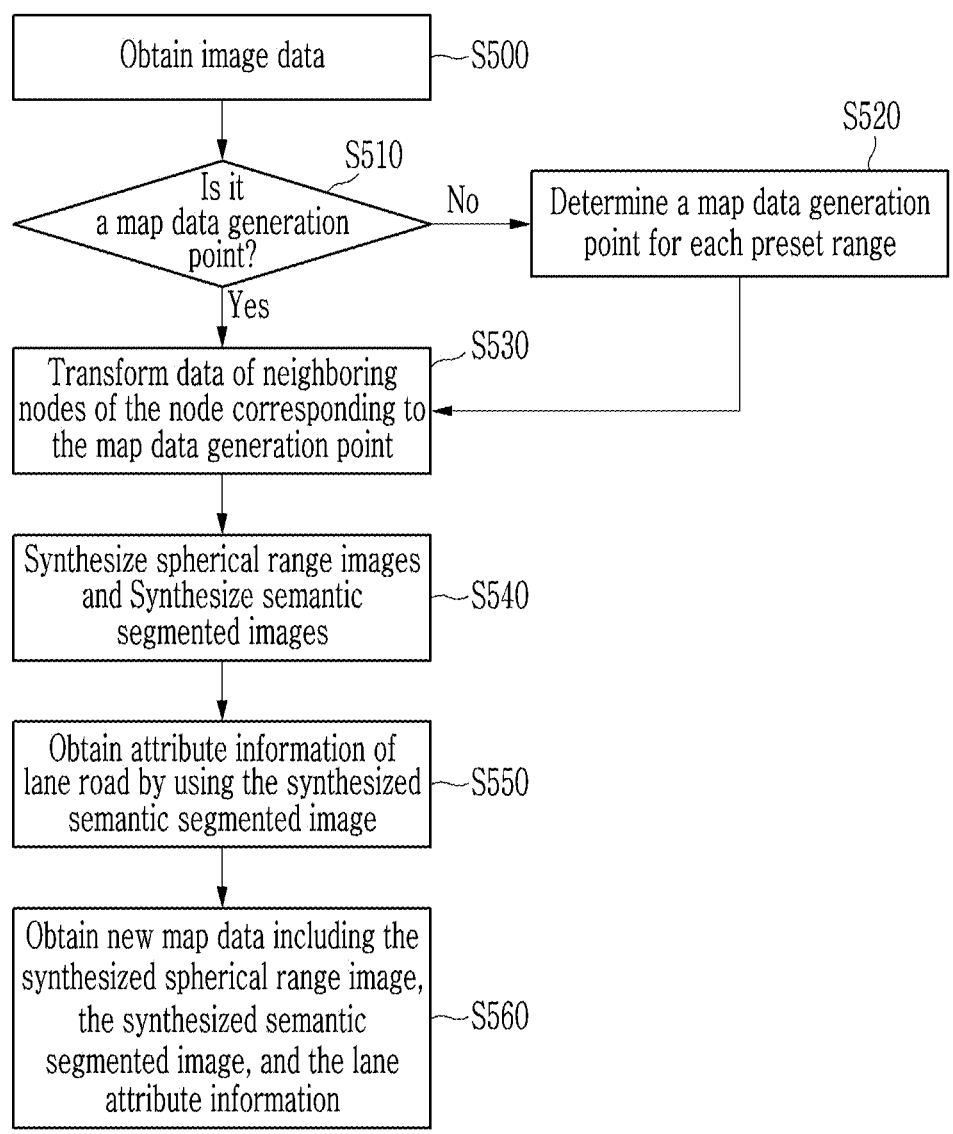
FIG. 12 is a flowchart of a method for generating map data according to an embodiment of the present disclosure.

FIG. 12 is a flowchart of a method for generating map data according to an embodiment of the present disclosure.

If the map nodes are not connected during the location recognition process, or if the residual error is large even though they are connected, it is necessary to create or update the map data. A point for generating new map data is preferentially set as an intersection area for loop closure detection. In areas other than intersections, map data is generated for each preset range. However, the present disclosure is not necessarily limited thereto.

As shown in FIG. 12, image data, that is, a spherical range image and a semantic segmented image, are obtained from data obtained from a sensor (LiDAR or camera, etc.) (S500). In this case, a spherical range image and a semantic segmented image are obtained based on the method described above (the method according to FIGS. 4 to 6 and the method according to FIGS. 7 and 8).

It is determined whether it is a map data generation point (e.g., an intersection) based on the obtained image (S510). For example, in order to determine whether there is an intersection, a binary classifier using a deep neural network may be used. As an input of the binary discriminator, a spherical range image and a semantic segmented image can be used.

In an area other than the intersection that is the map data generation point, it is determined to generate map data for each preset range (S520). For example, after the previous map data is generated, a point having the highest confidence score of the binary discriminator in the range of 0 m to 60 m is selected as the map data generation point, and new map data is generated.

At the map data generation point, map data is synthesized to improve precision. To this end, first, coordinate transformation is performed on the data of the neighboring nodes of the node corresponding to the map data generation point (S530).

Figure 13:
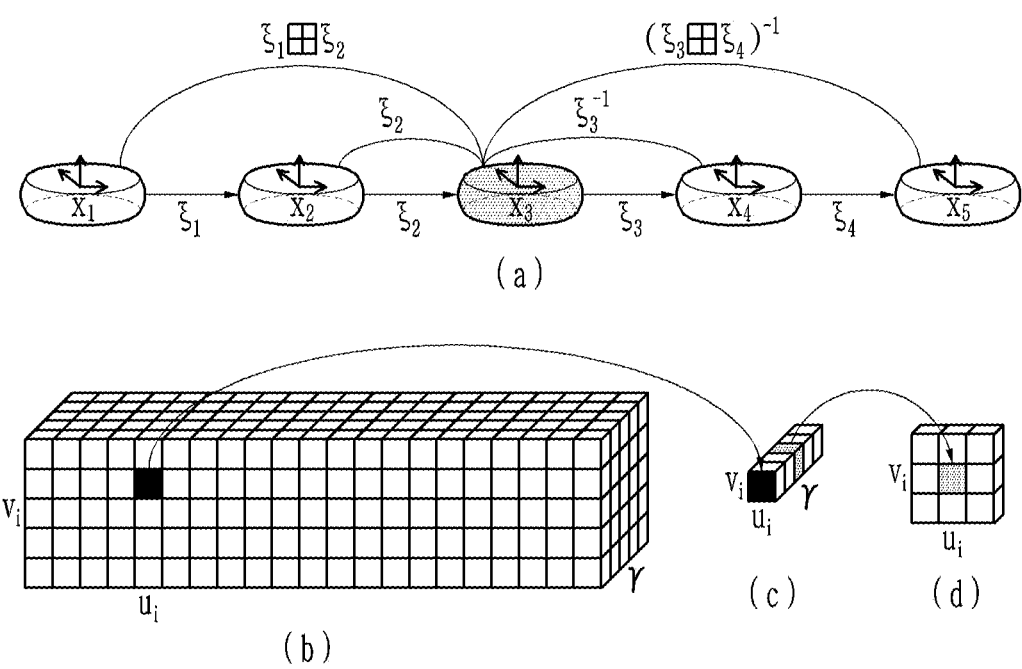
FIG. 13 is an exemplary diagram illustrating map data generation according to an embodiment of the present disclosure.

FIG. 13 is an exemplary diagram illustrating map data generation according to an embodiment of the present disclosure.

For example, in (a) of FIG. 13, when a node $x_3$ is selected as a map data generation point, data of neighboring nodes are converted into coordinate data based on the node $x_3$ and then synthesized. Coordinate transformation is performed based on edge information of each node.

Map data is synthesized based on the coordinate-transformed data. At this time, spherical range images of each node (node $x_3$ and its neighboring nodes) are synthesized, and semantic segmented images are synthesized (S540).

For spherical range image synthesis, as shown in (b) of FIG. 13, a three-dimensional memory having a volume $\mathbb{Y}$ of the same size as the image to be synthesized is used. The data of each node are converted from edge information into three-dimensional coordinates based on node $x_3$, and after calculating the location of the pixel in the same way as generating a spherical range image (e.g., obtaining a location by projection to a 2D surface using a spherical coordinate system), the corresponding value on the volume of the pixel corresponding to the calculated location is sequentially accumulated. In this way, initialization of volume data is completed. Then, as in (c) of FIG. 13, the values substituted for each individual pixel are sorted, and, for example, a value located at a set point (e.g., a middle point) is selected to generate 2D image data. Here, a value of a middle location may be selected using a temporal median filter. Finally, as illustrated in (d) of FIG. 13, in the two-dimensional image data, each image pixel ($u_i$, $v_i$) and the surrounding pixel values are aligned together to obtain the maximum value, the minimum value, and the middle value. When the value of the pixel ($u_j$, $v_j$) is the maximum value or the minimum value, a final synthesized image is obtained by substituting the value with the middle value, where an adaptive median filter may be used.

Meanwhile, even when synthesizing semantic segmented images, volume data is initialized in the same way as spherical range image synthesizing as described above. Instead of using the median filter, a voting method that defines the value occupying the largest proportion (the most distributed value) among the values for the pixel as the representative value is used to generate 2D image data.

Then, the maximum, minimum, and middle values are obtained by aligning each image pixel ($u_i$, $v_i$) and the surrounding pixel values together, and if a value of each pixel ($u_i$, $v_i$) is the maximum or minimum value, it is substituted with the middle value to finally obtain a synthesized image.

Then, attribute information of the lane is obtained. In order for the autonomous vehicle to drive, not only location information but also lane attribute information to be driven is required. In an embodiment of the present disclosure, attribute information of the lane is obtained using the synthesized semantic segmented image (S550). Since the synthesized semantic segmented image classifies lane marking, road boundary, and road surface indication information with high precision, it is possible to easily obtain lane attribute information using this. For example, in the synthesized semantic segmented image, lane marking and road boundary information is converted into line information by using Hough transform or Radon transform, etc., and 3D coordinates corresponding thereto are obtained. In addition, road surface indication information such as speed limit and driving direction can be classified using existing classification techniques such as deep neural networks. Through this process, attribute information of the lane is obtained.

In this way, new map data including the synthesized spherical range image, the synthesized semantic segmented image, and the lane attribute information are finally generated (S560).

Since synthesis is required only at the time of map data generation, it is desirable that the process of generating map data be operated in a separate process. Also, the pixel data are independent of each other, and then map data generation can be implemented very efficiently using modern multi-core CPUs or GPUs.

Meanwhile, for efficient storage and management of such map data, map data compression may be performed.

FIG. 14A to FIG. 14D are exemplary diagrams illustrating compressed map data according to an embodiment of the present disclosure.

The map data includes, for each node of the graph, a spherical range image, a semantic segmented image, lane attribute information, and pose information, and further includes a time at which the map data is generated, GPS location information (GPS data), and the like. A spherical range image and a semantic segmented image occupy most of the data storage space. Accordingly, these images are first compressed using a lossless image compression method such as Portable Network Graphics (PNG), Joint Photographic Experts Group-Lossless (JPEG-LS), JPEG2000, and Free Lossless Image Format (FLIF). For example, when the size of an image is 2048×192, it is reduced to about 200 kB through FLIF compression.

In addition, in order to further reduce the size of data and to manage it efficiently, the two compressed images are combined into one image and stored. To this end, data of a spherical range image and data of a semantic segmented image are stored for each pixel.

Figure 14A:
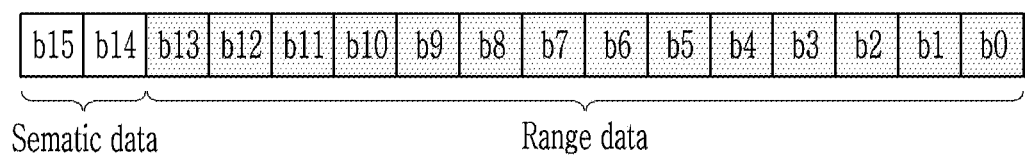
FIG. 14A to FIG. 14D are exemplary diagrams illustrating compressed map data according to an embodiment of the present disclosure.

As illustrated in FIG. 14A, each pixel is set to have a depth of a preset bit (e.g., 16 bits). Distance information of the spherical range image is quantized in centimeter units and placed in the lower bit of the pixel (as range data), and some information of the semantic segmented image is quantized and placed in the upper bit of the pixel (as semantic data).

For distance information of a spherical range image, sufficient precision can be obtained by having centimeter precision for a distance of up to 160 meters. In the semantic segmented image, only some information (segmentation information) such as lane marking, road marking, and road boundary is sampled and quantized and placed in the upper bit of the pixel.

Since the data change amount of distance information is significantly higher than that of segmentation information, higher compression efficiency can be expected by placing the data in the lower bit. However, the present disclosure is not necessarily limited thereto.

Figure 14B:
Figure 14C:
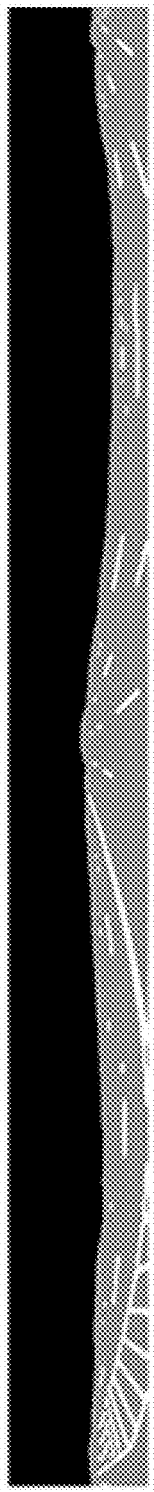
Figure 14D:

As described above, the distance information of the spherical range image and the segmentation information of the semantic segmented image, which are compressed and stored, can be separated into the original images through a simple bit operation. An example of separated images is shown in FIG. 14B to FIG. 14D. A spherical range image separated from the information stored for each pixel as shown in FIG. 14A is shown in FIG. 14B, and a semantic segmented image separated from the information stored for each pixel as shown in FIG. 14A is shown in FIG. 14C. The final result of synthesizing FIG. 14B and FIG. 14 C is in FIG. 14D.

It can be expected that the map data provided in the embodiment of the present disclosure is reduced to $1/100$ or less compared to the existing three-dimensional coordinates. In an actual implementation, about 10 GB of 3D point data is generated for a 3D shape of 1 km, and storage space of about 500 MB or more is required when the 3D data is expressed in voxels of 10 cm. However, according to an embodiment of the present disclosure, a size of 5 MB or less could be expressed with higher precision. For example, since the total road length of Korea is about 110,000 km, when using the method according to an embodiment of the present disclosure, it is possible to express a three-dimensional precision map of all roads in a size of about 500 GB, and it is possible for autonomous vehicles to mount a three-dimensional precision map of all roads.

The map data to be compressed in this way is registered and used. When the map data management part (refer to FIG. 3) receives the new map data, it may be compared with the existing map data to determine whether to register the new map data or update the existing map data. For example, when there is no existing map data in the coordinates surrounding the received new map data, the new map data is registered. On the other hand, if there is existing map data, it is not immediately updated, but whether it is a temporary change or a measurement error is determined, and updating may be selectively performed according to the result of the determination. To this end, if there is existing map data, new map data is registered as additional map data along with time information. Afterwards, when data collected by another device (e.g., another vehicle) is received or when the map data of the corresponding point is repeatedly received by driving the same route, the additional map data along with time information is compared with the received data. The existing map data may be updated based on the additional map data only when different changes are maintained during a period. Comparison of map data may use residuals of pose estimation. In addition, it is desirable to limit the maximum amount of additional map data, and to discard data that has not been used for a long time from time to time.

Meanwhile, optimization may be performed on the obtained map data according to an embodiment of the present disclosure.

Figure 15A:
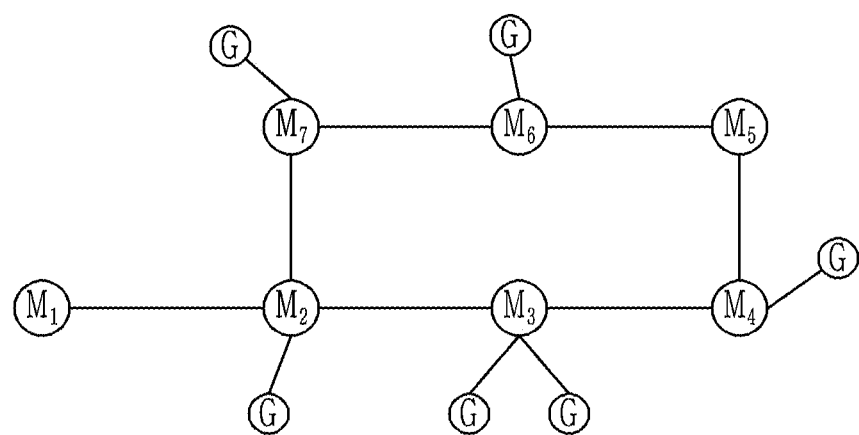
FIG. 15A and FIG. 15B are exemplary diagrams illustrating optimization of map data according to an embodiment of the present disclosure.
Figure 15B:
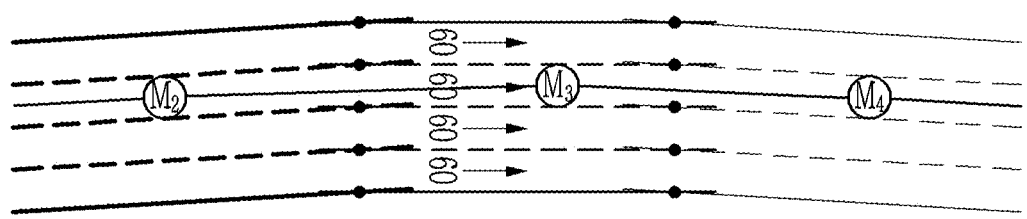

FIG. 15A and FIG. 15B are exemplary diagrams illustrating optimization of map data according to an embodiment of the present disclosure.

A map according to an embodiment of the present disclosure is a graph-based structure, and has a pose graph structure as shown in FIG. 15A and FIG. 15B. In this case, each node and edge of the graph is generated as shown in FIG. 15A. For a specific method, reference may be made to the method described above, and detailed description thereof will be omitted herein. Then, using the GPS location information, the GPS node G is connected to the graph. At this time, like a node $M_3$, multiple GPS nodes may be connected using additional map data. A GPS node may be added when the error of the GPS information is large during repeated driving. Through this, it is possible to remarkably increase the locational accuracy.

The most important means of increasing the precision in such a pose graph is to detect loop closures such as nodes $M_2$ and $M_7$ and optimize the graph after connecting the nodes. In vehicle driving, roof closures generally occur at intersections. As described above, a candidate node is selected using an intersection detection reliability score, a pose and their residual base on them between the candidate nodes are calculated, and a loop closure is determined when the residual is less than or equal to a threshold value.

Finally, as shown in FIG. 15B, a high-resolution map of the lane level is generated by combining the attribute information of the lane included in each node using the optimized pose information. Among the lane attributes of each node, lane marking information is combined with the node's pose information, converted into lane marking information having global coordinates on the map, and then compared with those of neighboring nodes to find the intersection of the lane markings. Using these intersections to connect lane markings one after another, it is possible to create a lane-level high-resolution map that matches the optimized map. The lane-level map generated in this way is managed as a separate map layer, used for route planning of autonomous vehicles, etc., and can be updated together when the node link of the 3D map data is optimized.

Figure 16:
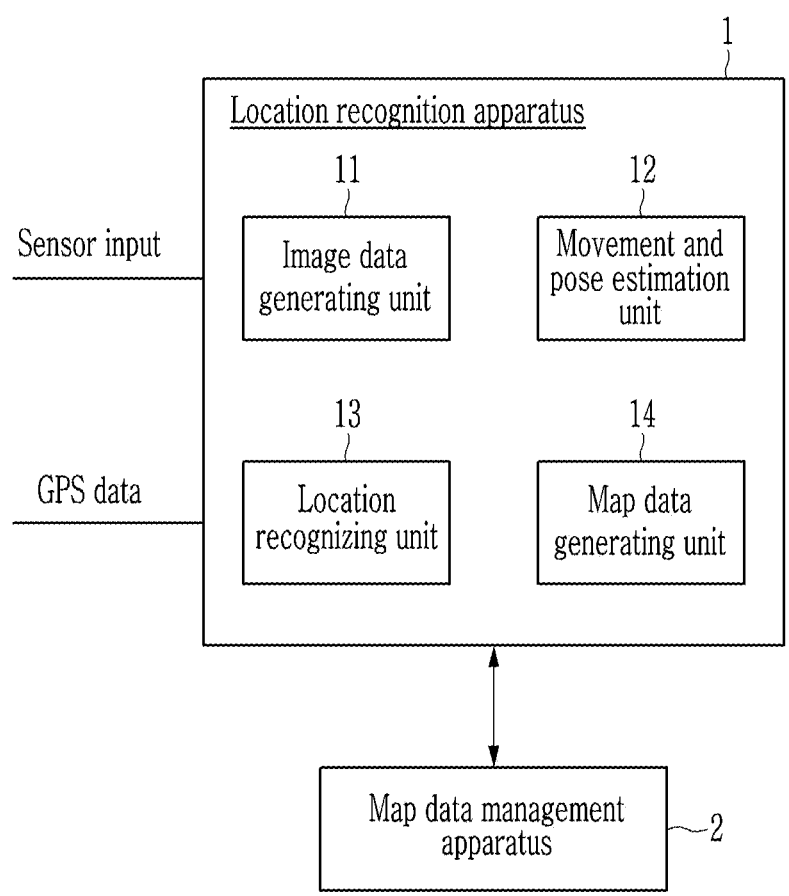
FIG. 16 is a diagram illustrating a structure of a location recognition apparatus according to an embodiment of the present disclosure.

FIG. 16 is a diagram illustrating a structure of a location recognition apparatus according to an embodiment of the present disclosure.

As shown in FIG. 16, the location recognition apparatus 1 includes an image data generating unit 11 that generates image data based on a sensor input, a movement and pose estimation unit 12, and a location recognizing unit 13, and further includes a map data generating unit 14.

The image data generating unit 11 includes a spherical range image generator configured to generate a spherical range image by projecting a sensor input (three-dimensional coordinate information corresponding to three-dimensional spatial information) onto a two-dimensional plane, and a semantic segmented image generator configured to generate a semantic segmented image by receiving the spherical range image and a texture image corresponding thereto as an input and performing semantic segmentation. The semantic segmented image may be an image in which moving object information is removed and road information is included.

The movement and pose estimation unit 12 is configured to perform movement and pose estimation using a spherical range image or a semantic segmented image, and obtain pose information as a result.

The location recognition unit 13 is configured to perform location recognition using already generated map data, pose information that is a result of movement and pose estimation based on image data (a spherical range image, a semantic segmented image), and GPS information.

The map data generating unit 14 is configured to generate map data including image data (a spherical range image, a semantic segmented image), pose information, and lane attribute information.

Since each of these components 11 to 14 is configured to implement the corresponding method described above, refer to the above description for specific functions.

The location recognition apparatus 1 according to an embodiment of the present disclosure may be implemented in a form of being mounted on a traveling vehicle, etc., and may operate in conjunction with a map data management apparatus 2. For example, the location recognition apparatus 1 may receive existing map data from the map data management apparatus 2 or provide generated map data to the map data management apparatus 2. Meanwhile, the map data generating unit 14 is implemented in a form of being included in the location recognition apparatus 1, but is not limited thereto and may be implemented in a form of being included in other devices such as the map data management apparatus 2.

Figure 17:
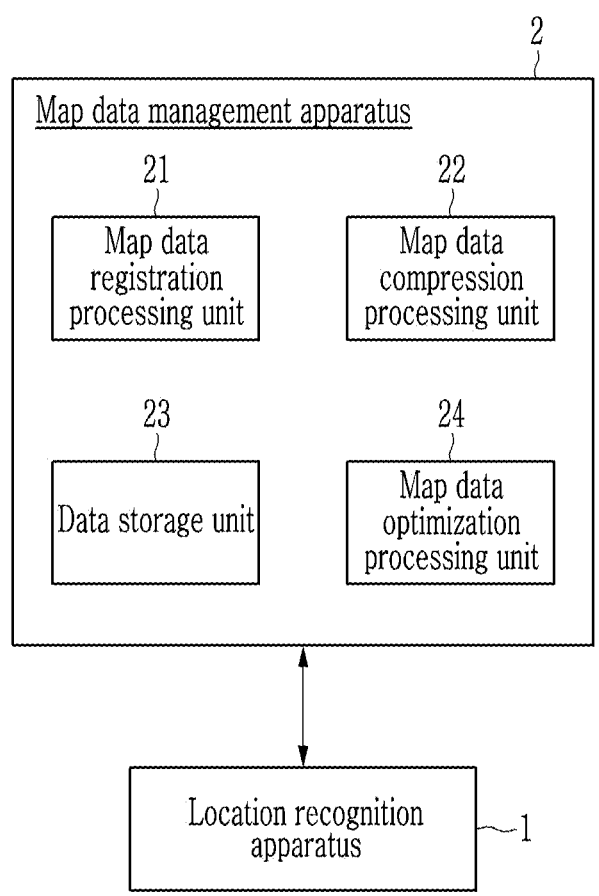
FIG. 17 is a diagram illustrating a structure of a map data managing apparatus according to an embodiment of the present disclosure.

FIG. 17 is a diagram illustrating a structure of map data managing apparatus according to an embodiment of the present disclosure.

As shown in FIG. 17, the map data management apparatus 2 includes a map data registration processing unit 21, a map data compression processing unit 22, a data storage unit 23, and a map data optimization processing unit 24.

The map data registration processing unit 21 is configured to register map data as new map data or compare it with existing map data to perform update processing on existing map data.

The map data compression processing unit 22 is configured to perform processing for storing the map data to be registered (simply referred to as storage processing). In particular, the map data compression processing unit 22 processes the image data constituting the map data, that is, a spherical range image and a semantic segmented image, into one image. For each pixel, the distance information of the spherical range image is quantized and placed in the upper bit of the bit constituting a pixel, and segmentation information of the semantic segmented image is sampled and quantized to be placed in the lower bit of the bit constituting the pixel. Prior to such storage processing, the spherical range image and the semantic segmented image may be first compressed, and the above storage processing may be performed on the compressed images.

The data storage unit 23 is configured to store map data. The map is composed of a graph-based structure, and map data is stored for each node constituting the graph. The map data includes a spherical range image, a semantic segmented image, lane attribute information, and pose information, and further includes a time at which the map data is generated, GPS location information, and the like. The spherical range image and the semantic segmented image may be stored after being processed through the above storage process.

The map data optimization processing unit 24 is configured to perform optimization processing on graph-based map data.

Since each of these components 21 to 24 is configured to implement the corresponding method described above, refer to the description above for specific functions.

The map data management apparatus 2 according to an embodiment of the present disclosure may be implemented in the form of a server, for example, and may operate in conjunction with the location recognition apparatus 1. For example, the map data management apparatus 2 receives map data newly generated from the location recognition apparatus 1 and registers, stores, and optimizes the map data, or transfers the managed map data to the location recognition apparatus 1.

Figure 18:
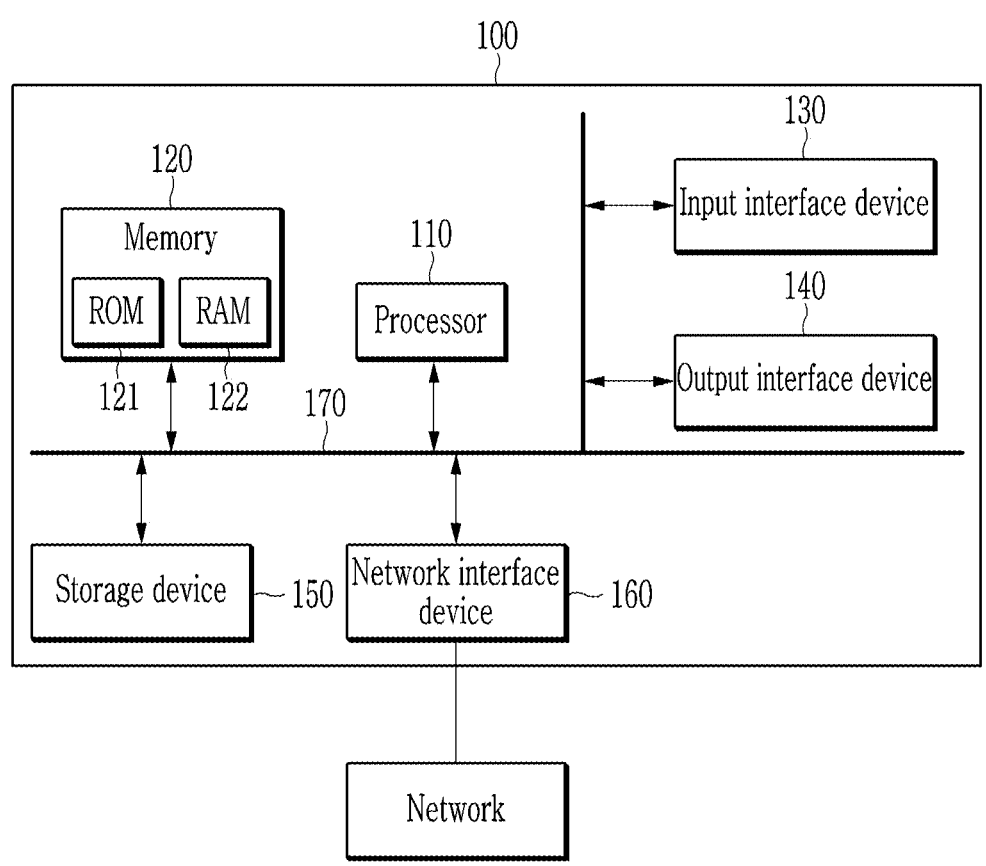
FIG. 18 is a structural diagram illustrating a computing device for implementing a method according to an embodiment of the present disclosure.

FIG. 18 is a structural diagram illustrating a computing device for implementing a method according to an embodiment of the present disclosure.

As shown in FIG. 16, the method (each method for map generation and management and location recognition described in the above embodiment) according to an embodiment of the present disclosure may be implemented using a computing device 100.

The computing device 100 may include at least one of a processor 110, a memory 120, an input interface device 130, an output interface device 140, a storage device 150, and a network interface device 160. Each of the components may be connected by a bus 170 to communicate with each other. In addition, each of the components may be connected through a separate interface or a separate bus centering on the processor 110 instead of the common bus 170.

The processor 110 may be implemented as various types such as an application processor (AP), a central processing unit (CPU), a graphics processing unit (GPU), and the like, and may be any semiconductor device that executes an instruction stored in the memory 120 or the storage device 150. The processor 110 may execute a program command stored in at least one of the memory 120 and the storage device 150. The processor 110 may execute a program command stored in at least one of the memory 120 and the storage device 150. For example, the processor 110 may be configured to perform functions of the image data generating unit, the movement and pose estimation unit, the location recognizing unit, and the map data generating unit. Alternatively, the processor 110 may be configured to perform functions of the map data registration processing unit, the map data compression processing unit, and the map data optimization processing unit.

The memory 120 and the storage device 150 may include various types of volatile or non-volatile storage media. For example, the memory may include a read-only memory (ROM) 121 and a random access memory (RAM) 122. In an embodiment of the present disclosure, the memory 120 may be located inside or outside the processor 110, and the memory 120 may be connected to the processor 110 through various known means.

The input interface device 130 is configured to provide input data (e.g., sensor inputs) to the processor 100, and the output interface device 140 is configured to output data (e.g., map data, recognized vehicle location, etc.) from the processor 110.

The network interface apparatus 160 may transmit or receive a signal with another device (e.g., an autonomous driving system) through a wired network or a wireless network.

The input interface device 130, the output interface device 140, and the network interface device 160 may be collectively referred to as an "interface device".

The computing device 100 having such a structure is called a location recognition apparatus/map data management apparatus, and may implement the above methods according to an embodiment of the present disclosure.

In addition, at least a part of the method according to an embodiment of the present disclosure may be implemented as a program or software executed in the computing device 100, and the program or software may be stored in a computer-readable medium.

In addition, at least a part of the method according to an embodiment of the present disclosure may be implemented as hardware capable of being electrically connected to the computing device 100.

According to embodiments, map data can be generated by shaping a pattern of a road surface, a pattern around a road, and 3D shape information with a single image, so that a 3D high-precision map for autonomous driving, etc., can be generated and provided using a small data storage space. In particular, it is possible to generate and provide map data including an image in which distance information and semantic segmentation information are projected on a spherical plane, corresponding to 3D coordinate information corresponding to 3D space, and attribute information of a land road.

In addition, shape information (spherical range image), pattern information (semantic segmented image), and lane attribute information are generated as one set of map data, and based on this, the location of a vehicle, etc. can be easily recognized and automatically generated and updated.

In addition, since map data is stored for each graph-based node, management such as creation and update is advantageous.

The embodiments of the present disclosure are not implemented only through the apparatus and/or method described above, but may be implemented through a program for realizing a function corresponding to the configuration of the embodiment of the present disclosure, and a recording medium in which the program is recorded. This implementation can also be easily performed by expert person skilled in the technical field to which the present disclosure belongs from the description of the above-described embodiments.

The components described in the embodiment s may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the embodiment s may be implemented by software, and the software may be recorded on a recording medium. The components, functions, and processes described in the embodiment s may be implemented by a combination of hardware and software.

The method according to embodiment s may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated with, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific embodiment. Features described in the specification in the context of individual embodiment s may be implemented as a combination in a single embodiment. In contrast, various features described in the specification in the context of a single embodiment may be implemented in multiple embodiment s individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood that the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described embodiment s in all embodiment s, and it should be understood that the above-described program components and apparatuses may be incorporated into a single software product or may be packaged in multiple software products. It should be understood that the embodiment s disclosed herein are merely illustrative and are not intended to limit the scope of the disclosure. It will be apparent to one of ordinary skill in the art that various modifications of the embodiment s may be made without departing from the spirit and scope of the claims and their equivalents.

What is claimed is:
1. A method for generating a map for autonomous driving, comprising:
    obtaining three-dimensional (3D) coordinate information corresponding to a 3D space;
    obtaining a spherical range image by projecting the 3D coordinate information onto a two-dimensional (2D) plane;
    generating a semantic segmented image by performing semantic segmentation on the spherical range image; and
    generating map data including the spherical range image, the semantic segmented image, and lane attribute information,
    wherein the map has a graph-based structure, the map data is mapped for each node constituting a graph,
    wherein the generating of a map data comprises:
    obtaining map data of neighboring nodes around a node corresponding to a map data generation point in a state in which map data of the node is generated; and
    synthesizing map data of the node and map data of the neighboring nodes and using them as map data for the node,
    wherein the synthesizing of map data of the node and map data of the neighboring nodes comprises:
    synthesizing a spherical range image of the node and a spherical range image of the neighboring node;
    synthesizing a semantic segmented image of the node and a semantic segmented image of the neighboring node;
    generating the lane attribute information based on the synthesized semantic segmented image; and
    using data including the synthesized spherical range image, the synthesized semantic segmented image, and the lane attribute information as map data for the node.
2. The method of claim 1, wherein
the generating of a semantic segmented image comprises:
performing semantic segmentation on the spherical range image; and
generating the semantic segmented image including road information by removing a moving object from the image obtained by the semantic segmentation,
    wherein the road information is used as segmentation information including a pattern of a road surface, a road pattern, and a pattern around a road, and the attribute information of a land road is obtained using the segmentation information included in the semantic segmented image.
3. The method of claim 1, wherein edge information between nodes includes pose information, and
    the pose information is a result of movement and pose estimation using a gradient of the spherical range image or a gradient of the semantic segmented image.
4. The method of claim 1, wherein
in the synthesizing of a spherical range image, a synthesized spherical range image is obtained based on a method of selecting a middle value from values accumulated for each pixel, and
in the synthesizing of a semantic segmented image, a synthesized semantic segmented image is obtained based on a method of selecting a value having a largest proportion among values accumulated for each pixel.
5. The method of claim 4, wherein
when synthesizing spherical range images or synthesizing semantic segmented images,
the synthesizing is performed in a way in which coordinate transformation on an image of the node and an image of the neighboring node is performed based on the node, and a value of a corresponding pixel of the image of the node and a value of a corresponding pixel of the image of the neighboring node are accumulated and stored for each pixel, 2D image data is obtained by selecting one of values accumulated for each pixel, and for each pixel of the 2D image data, a final value of a pixel is obtained based on a result of comparing values of neighboring pixels with values of the pixel.

6. The method of claim 1, further comprising compressing the map data,
wherein in the compressing,
for each pixel, the spherical range image and the semantic segmented image is combined into one image and stored, and for a pixel composed of set bits, distance information of the spherical range image is placed in a first bit among the set bits and segmentation information of the semantic segmented image is placed in a second bit among the set bits.

7. The method of claim 6, wherein
the compressing comprises:
compressing the spherical range image and the semantic segmented image, respectively;
quantizing distance information of the compressed spherical range image, and placing the quantized distance information in an upper bit among the set bits of a pixel; and
quantizing segmentation information of the compressed semantic segmented image, and placing the quantized segmentation information in a lower bit among the set bits of a pixel.

8. The method of claim 1, further comprising registering the map data,
wherein the registering comprises:
registering a generated map data as new map data when there is no existing map data in surrounding coordinates of the generated map data; and
updating the existing map data based on the generated map data when there is existing map data in the surrounding coordinates of the generated map data.

9. The method of claim 8, wherein
the updating comprises:
repeatedly performing an operation of storing the generated map data as additional map data together with time information; and
comparing the stored map data and updating the existing map data based on the additional map data when different changes in the stored map data are maintained for a preset time.

10. The method of claim 1, further comprising optimizing the graph constituting a map,
wherein the optimizing comprises:
connecting a global positioning system (GPS) node having GPS data to a corresponding node when GPS data is obtained for each node;
connecting corresponding nodes when loop closure is detected in the graph; and
combining lane attribute information included in each node using pose information.

11. A method for recognizing a location based on a map for autonomous driving, comprising:
obtaining a spherical range image based on data input from a sensor at a current node, and generating a semantic segmented image from the spherical range image;
obtaining an initial location based on global positioning system (GPS) data or a previous driving route;
searching map data from the map based on the initial location; and
obtaining a current location based on the searched map data,
wherein the map data of the map includes the spherical range image, the semantic segmented image, and lane attribute information,
wherein the map has a graph-based structure, the map data is mapped for each node constituting a graph,
the method further comprises:
generating map data including a spherical range image, a semantic segmented image, and lane attribute information,
wherein the generating map data including a spherical range image, a semantic segmented image, and lane attribute information comprises:
obtaining map data of neighboring nodes around a node corresponding to a map data generation point in a state in which map data of the node is generated;
synthesizing a spherical range image of the node and a spherical range image of the neighboring node;
synthesizing a semantic segmented image of the node and a semantic segmented image of the neighboring node;
generating the lane attribute information based on the synthesized semantic segmented image; and
using data including the synthesized spherical range image, the synthesized semantic segmented image, and the lane attribute information as map data for the node.

12. The method of claim 11, wherein
edge information between nodes includes pose information, and
the pose information is a result of movement and pose estimation using a gradient of the spherical range image or a gradient of the semantic segmented image.

13. The method of claim 12, wherein
the obtaining of a current location comprises:
estimating pose information of the current node with respect to the searched map data;
obtaining the current location using the map data when the estimated pose information and pose information according to movement of the current node satisfy a setting condition; and
additionally obtaining the current location using the GPS data when there is GPS data in the current node.

14. An apparatus for recognizing a location, comprising:
an interface device; and
a processor connected to the interface device and configured to perform location recognition, wherein
the processor is configured to perform operations by:
projecting three-dimensional (3D) coordinate information corresponding to a 3D space inputted through the interface device onto a two-dimensional (2D) plane to obtain a spherical range image;
generating a semantic segmented image by performing semantic segmentation on the spherical range image;
obtaining an initial location based on global positioning system (GPS) data or a previous driving route;
searching map data from the map based on the initial location; and
obtaining a current location based on the searched map data,
wherein the map data of the map includes the spherical range image, the semantic segmented image, and lane attribute information,
wherein the map has a graph-based structure, the map data is mapped for each node constituting a graph,
wherein
the processor is configured to further perform an operation by generating map data including a spherical range image, a semantic segmented image, and lane attribute information, and when performing the operation of generating map data, the processor is specifically configured to perform operations by:

obtaining map data of neighboring nodes around a node corresponding to a map data generation point in a state in which map data of the node is generated;

synthesizing a spherical range image of the node and a spherical range image of the neighboring node;

synthesizing a semantic segmented image of the node and a semantic segmented image of the neighboring node;

generating the lane attribute information based on the synthesized semantic segmented image; and using data including the synthesized spherical range image, the synthesized semantic segmented image, and the lane attribute information as map data for the node.

15. The apparatus of claim 14, wherein edge information between nodes includes pose information, and the pose information is a result of movement and pose estimation using a gradient of the spherical range image or a gradient of the semantic segmented image.

16. The apparatus of claim 14, wherein when performing the operation of generating a semantic segmented image, the processor is specifically configured to perform operations by:

performing semantic segmentation on the spherical range image; and generating the semantic segmented image including road information by removing a moving object from the image obtained by the semantic segmentation, wherein the road information is used as segmentation information including a pattern of a road surface, a road pattern, and a pattern around a road, and the attribute information of a land road is obtained using the segmentation information included in the semantic segmented image.

17. The apparatus of claim 14, wherein the map data is compressed and stored, wherein when compressing, for each pixel, the spherical range image and the semantic segmented image are combined into one image and stored, and for a pixel composed of set bits, distance information of the spherical range image is placed in a first bit among the set bits and segmentation information of the semantic segmented image is placed in a second bit among the set bits.

* * * * *